(12) United States Patent
Sieffert et al.

(10) Patent No.: US 9,996,374 B2
(45) Date of Patent: Jun. 12, 2018

(54) DEPLOYMENT AND INSTALLATION OF UPDATES IN A VIRTUAL ENVIRONMENT

(71) Applicant: Assured Information Security, Inc., Rome, NY (US)

(72) Inventors: Michael Joseph Sieffert, Whitesboro, NY (US); Jonathan Einstoss, Syracuse, NY (US); Stephen Raymond Pape, Ithaca, NY (US); Adam T. Meily, Whitesboro, NY (US)

(73) Assignee: ASSURED INFORMATION SECURITY, INC., Rome, NY (US)

(*) Notice: Subject to any disclaimer, the term of this patent is extended or adjusted under 35 U.S.C. 154(b) by 123 days.

(21) Appl. No.: 14/740,605

(22) Filed: Jun. 16, 2015

(65) Prior Publication Data
US 2016/0371105 A1    Dec. 22, 2016

(51) Int. Cl.
*G06F 9/455* (2018.01)
*G06F 9/445* (2018.01)

(52) U.S. Cl.
CPC ............ *G06F 9/45545* (2013.01); *G06F 8/67* (2013.01); *G06F 8/60* (2013.01)

(58) Field of Classification Search
CPC ......................... G06F 9/45533; G06F 9/45545
See application file for complete search history.

(56) References Cited

U.S. PATENT DOCUMENTS

| | | | |
|---|---|---|---|
| 7,996,836 B1 | 8/2011 | McCorkendale et al. | |
| 8,195,980 B2 | 6/2012 | Schuba et al. | |
| 8,276,201 B2 | 9/2012 | Schunter et al. | |
| 8,307,443 B2 | 11/2012 | Wang et al. | |
| 9,003,402 B1* | 4/2015 | Carbone | G06F 9/45554 718/1 |
| 2008/0320594 A1 | 12/2008 | Jiang | |
| 2009/0241109 A1 | 9/2009 | Wandergrift et al. | |
| 2009/0319740 A1* | 12/2009 | Nishi | G06F 13/102 711/163 |
| 2010/0031360 A1 | 2/2010 | Seshadri et al. | |
| 2010/0306766 A1* | 12/2010 | Schneider | G06F 9/45533 718/1 |

(Continued)

FOREIGN PATENT DOCUMENTS

| | | |
|---|---|---|
| EP | 2237154 A2 | 6/2010 |
| EP | 2237154 A3 | 6/2010 |
| WO | 2008130923 A1 | 10/2008 |

OTHER PUBLICATIONS

"Wu et al";"Towards Mandatory Security Monitoring in Virtualized Datacenter Environment";"Aug. 8, 2013";"IEEE";"12 pages".*

(Continued)

*Primary Examiner* — Wei Zhen
*Assistant Examiner* — Brahim Bourzik
(74) *Attorney, Agent, or Firm* — Matthew M. Hulihan; Heslin Rothenberg Farley & Mesiti PC

(57) ABSTRACT

An update is deployed to a guest virtual machine of a hypervisor during runtime of the guest virtual machine. An executing thread of the guest virtual machine is identified and execution of the thread is redirected to a function to open a handle to a file, of the guest virtual machine, to which data of the update is to be written. The data is provided to a component of the guest virtual machine, and then execution of the thread is redirected to a function to write the data provided to the component to the file.

18 Claims, 7 Drawing Sheets

(56) References Cited

U.S. PATENT DOCUMENTS

| | | |
|---|---|---|
| 2011/0258610 A1 | 10/2011 | Aaraj et al. |
| 2011/0321165 A1 | 12/2011 | Capalik et al. |
| 2011/0321166 A1 | 12/2011 | Capalik et al. |
| 2012/0102484 A1* | 4/2012 | Hopmann ............ H04L 63/105 717/176 |
| 2012/0159469 A1* | 6/2012 | Laor ................... G06F 9/4555 717/173 |
| 2012/0167080 A1* | 6/2012 | Vilayannur ........... G06F 3/0608 718/1 |
| 2012/0216181 A1* | 8/2012 | Arcese ..................... G06F 8/65 717/168 |
| 2012/0240224 A1 | 9/2012 | Payne et al. |
| 2012/0291030 A1 | 11/2012 | Fitzgerald et al. |
| 2013/0007733 A1* | 1/2013 | Fries ......................... G06F 8/68 718/1 |
| 2013/0254768 A1 | 9/2013 | Wipfel et al. |
| 2013/0276056 A1 | 10/2013 | Epstein |

OTHER PUBLICATIONS

Crosby, Simon, "Mind the Gap!—The Limitations of VM Introspection", A Collection of Bromides on Infrastructure, Oct. 12, 2012, pp. 1-2.

Mell, Peter et al. "Creating a Patch and Vulnerability Management Program", National Institute of Standards and Special Publication 300-40, 2005, pp. 1-75.

Zheng, Yuxing, "Oregon website breach: State officials failed to patch 'high risk' software problem", OregonLive.com, 2014, pp. 1-11.

Banjo, Shelly, "Home Depot Hackers Exposed 53 Million Email Addresses", Wall Street Journal, Nov. 6, 2014, pp. 1-5.

Schwartz, Matthew J., "ColdFusion Hacks Point to Unpatched Systems", www.darkreading.com, Nov. 7, 2013, pp. 1-11.

"Latest Gartner Magic Quadrant Positions VMware in Leaders Quadrant for x86 Server Virtualization Infrastructure", VMware, Jul. 11, 2013, pp. 1-3.

Bailey, "Winning the Race to Bare Metal", Blackhat, 2008, pp. 1-27.

Wojtczuk, Rafal, "Poacher Turned Gatekeeper: Lessons Learned From Eight Years of Breaking Hypervisors", Bromium, 2014, pp. 1-46.

International Search Report from International Application No. PCT/US14/63387 dated Jan. 26, 2015, pp. 1-16.

Nance, Kara et al., "Virtual Machine Introspection", Virtualization, IEEE Computer Society, 2008, pp. 32-37.

"Agent vs. Agentless Systems Management" [retrieved on May 22, 2015]. Retrieved from the Internet: URL <http://www.kaseya.com/resources/white-papers/agent-vs-agentless-systems-management>, Kaseya, pp. 1-3.

"Kaseya Virtual System Administrator (VSA)" [retrieved on May 22, 2015]. Retrieved from the Internet: URL <http://www.kaseya.com/solutions/virtual-administrator, Kaseya, pp. 1-4.

"VMware vSphere Update Manager" [retrieved on May 22, 2015]. Retrieved from the Internet: URL <http://www.vmware.com/products/vsphere/features/update-manager>, VMware, pp. 1-4.

"Shavlik Protect" [retrieved on May 22, 2015]. Retrieved from the Internet: URL <http://www.shavlik.com/products/protect/>, pp. 1-9.

"Virtual Machine Servicing Tool 2012", Microsoft Download Center, last accessed May 22, 2015, pp. 1-5.

"Flask Is Fun" [retrieved on May 22, 2015]. Retrieved from the Internet: URL <http://flask.pocoo.org/>, pp. 1-2.

"About LibVMI" [retrieved on May 22, 2015]. Retrieved from the Internet: URL <https://code.google.com/p/vmitools/wiki/LibVMIIntroduction>, VMITools, pp. 1-2.

"About the VMI Tools Project" [retrieved on Jun. 16, 2015]. Retrieved from the Internet: URL <https://code.google.com/p/> VMITools, pp. 1-2.

Dinaburg, Artem, et al., "Ether: Malware Analysis via Hardware Virtualization Extensions", CCS'08, Oct. 27, 31, 2008, pp. 1-12.

"Ether Malware Analysis via Hardware Virtualization Extensions" [retrieved on Jun. 16, 2015]. Retrieved from the Internet: URL <http://either.gtisc.gatech.edu/source.html>, pp. 1-7.

"The Volatility Framework" [retrieved on Jun. 16, 2015]. Retrieved from the Internet: URL <https://code.google.com/p/>, Volatility, pp. 1-2.

\* cited by examiner

DEPLOYMENT AND INSTALLATION OF UPDATES IN A VIRTUAL ENVIRONMENT

STATEMENT REGARDING FEDERALLY SPONSORED RESEARCH AND DEVELOPMENT

This invention is associated, in part, with government support under contract number FA8750-14-C-0183, awarded by the United States Air Force Research Laboratory. Accordingly, the United States Government may have certain rights in the invention.

BACKGROUND

Software updates such as code patches for a system are important for stability, efficiency, and sound security. The system's ability to manage software updates is a significant factor in ensuring updates are installed. In the security realm, software updates can proactively curtail exploits by minimizing the attack surface of information technology (IT) assets. Updates are effective when installation occurs in a timely and secure manner. Installation of security updates is considered a prudent use of security resources because the cost of proactive vulnerability mitigation is dwarfed by the resources required for incident detection, containment, remediation, and recovery. Significant cyber-attacks against states, countries, governmental entities, and businesses have been attributed to the failed patching of known vulnerabilities leading to compromise of sensitive data. Effective and secure facilities for installing updates are therefore critically important.

BRIEF SUMMARY

Shortcomings of the prior art are overcome and additional advantages are provided through the provision of a method that includes deploying an update to a guest virtual machine of a hypervisor during runtime of the guest virtual machine, the deploying including: identifying an executing thread of the guest virtual machine; redirecting execution of the thread to a function to open a handle to a file, of the guest virtual machine, to which data of the update is to be written; providing the data to a component of the guest virtual machine; and redirecting execution of the thread to a function to write the data provided to the component to the file.

Further, a computer program product is provided including a non-transitory computer-readable storage medium including program instructions for execution by a processor to perform a method that includes deploying an update to a guest virtual machine of a hypervisor during runtime of the guest virtual machine, the deploying including: identifying an executing thread of the guest virtual machine; redirecting execution of the thread to a function to open a handle to a file, of the guest virtual machine, to which data of the update is to be written; providing the data to a component of the guest virtual machine; and redirecting execution of the thread to a function to write the data provided to the component to the file.

Yet further, a computer system is provided that is configured to perform a method that includes: deploying an update to a guest virtual machine of a hypervisor during runtime of the guest virtual machine, the deploying including: identifying an executing thread of the guest virtual machine; redirecting execution of the thread to a function to open a handle to a file, of the guest virtual machine, to which data of the update is to be written; providing the data to a component of the guest virtual machine; and redirecting execution of the thread to a function to write the data provided to the component to the file.

Additional features and advantages are realized through the concepts of aspects of the present invention. Other embodiments and aspects of the invention are described in detail herein and are considered a part of the claimed invention.

BRIEF DESCRIPTION OF THE DRAWINGS

Aspects of the present invention are particularly pointed out and distinctly claimed as examples in the claims at the conclusion of the specification. The foregoing and other objects, features, and advantages of aspects of the invention are apparent from the following detailed description taken in conjunction with the accompanying drawings in which:

DETAILED DESCRIPTION

Figure 1:
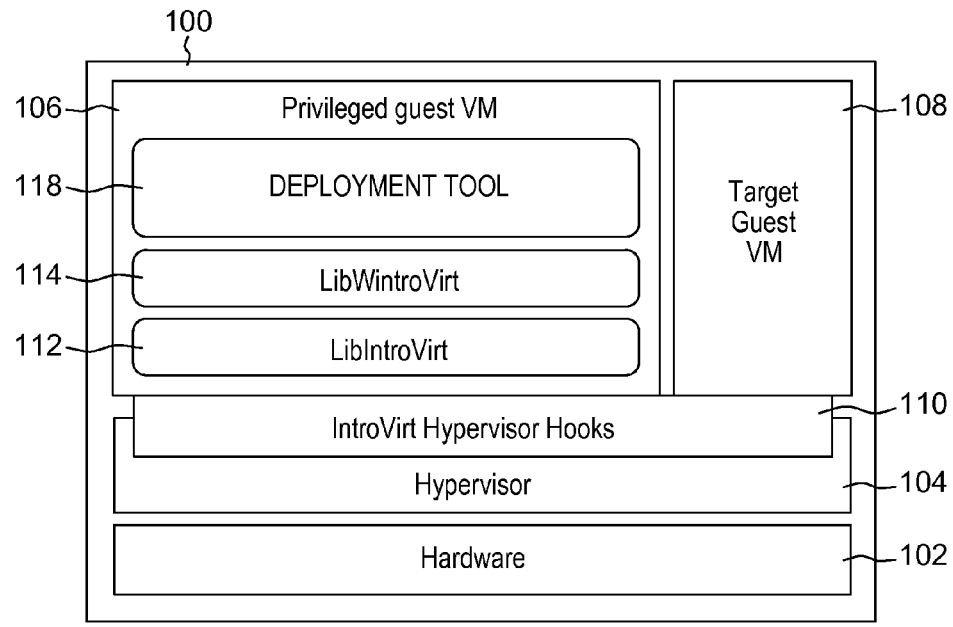
FIG. 1 depicts an example of a system implementing a virtual environment in accordance with aspects described herein.

Current update delivery methods typically rely on a centralized update server for delivering updates (also referred to herein as patches) to multiple end-point machines on a network. In the virtualization space, virtual machine patching methods take on agent-based or agentless approaches, distinguished by whether installation of software on the target virtual machine is required for fetching and installing an update. These approaches are generally independent of the virtualized nature of the systems being patched.

Agent-based patching involves the installation and execution of an application within a guest operating system executing in a virtual machine. The in-guest agent uses system application programming interfaces (APIs) to query a status of installed security updates. The agent can also read files on disk to obtain additional granularity of installed updates. The agent then communicates with a centralized server across a network and coordinates the download and installation of required updates. Software makers and other update providers use in-guest agents this way because execution within the guest operating system provides a high degree of context. Agent-based systems therefore usually rely on an active and correctly configured network interface to interact with the centralized server. These and other attributes of agent-assisted update installation render the method susceptible to attacks or degradation by malicious software.

Some agent-based solutions compare host state with a baseline and issue updates based on that comparison. Such an approach may move the guest virtual machine to another host during patching and automatically take a snapshot before the update installs, in case software functionality breaks during the process. The approach nevertheless relies on a specific process in the guest that communicates with the underlying hypervisor, performs the necessary checking of the system status and privileges, and calls-up installation from the process in the guest.

Agentless solutions, on the other hand, typically use pre-existing software on the target system, i.e. the system to receive the update, to collect information regarding installed updates. As an example, the solution may provide a unified information technology management platform for both hardware and virtual machines. However, agentless virtual machines to be patched are normally stopped (i.e. not started for execution) and patched while the machine is down. This affords the patching system the advantage of easy access to the virtual disk of the virtual machine to conveniently move the update onto the virtual disk. When the virtual machine is stopped, the virtual disk of that machine is available for mounting and therefore easily written-to. Then, when the virtual machine is booted, the update is read from disk and installed. In contrast, when a virtual machine is booted and running, the virtual disk is mounted by an entity such as the operating system of the guest virtual machine, and therefore attempts by another entity to mount an already-mounted disk can cause problems. Therefore, many agentless solutions work by a component enumerating the installed system updates of an offline virtual machine by examining its virtual disk file, determining updates to install, and then writing them to the offline virtual machine.

In other examples, a component targets offline virtual machines that are used as templates for other virtual machines, in which an offline virtual machine is transparently booted, the update is installed to the running machine, and then the machine is shut down. The virtual machine is therefore up-to-date when it is used as a template for new virtual machines.

As virtualization of resources and cloud computing become ubiquitous, effective patching of virtualized hosts is more critical than ever. Both servers and workstations are being increasingly migrated to virtualization infrastructures because of a lower cost of ownership/maintenance, increased security, enhanced resiliency to hardware failures, and higher performance. In a virtualization infrastructure, a hypervisor operates at a layer between guest virtual machines and hardware and has a unique and powerful perspective on code executing within the guest virtual machine(s). Virtualization technology enables hypervisors to intercept, monitor, and modify many aspects of guest virtual machine software execution. In addition, hypervisors are considered to be largely impervious to the effects of malicious code present in guests. These characteristics solidify hypervisors as a technology that enables enhanced security and support to guest systems. Application of updates directly from the hypervisor to guest virtual machines is more appealing. Moving away from the traditional update delivery model in which one or more agents perform the checking, fetching, and installing, to one based upon hypervisor technology can provide several benefits. For instance, network resource expenditure is reduced due to the elimination of redundant traffic from servers pushing similar updates to large groups of machines. Also, machines with misconfigured settings or without operable network connectivity are able to receive updates. Further, the hypervisor can protect the update installation process from the effects of malicious code residing in the guest.

Described herein are capabilities for deploying and installing updates, such as security updates, to guest virtual machines directly from a hypervisor. This may be accomplished through a modular system design including a graphical user interface. The hypervisor is leveraged to collect and modify execution of guest software, allowing for sophisticated introduction of effects into guest virtual machines. This moves aspects of the updating process away from the traditional, but aging, network-server approach and into the modern era with its use of virtualization technology. In some embodiments, the high-level system design includes three primary components termed herein a back-end, a front-end, and a database. The back-end intercepts and injects execution flow to the guest virtual machines via the hypervisor. The front-end provides an interface for a user, displaying system status and accepting input commands, among other tasks. The database stores configuration, virtual machine, and update information used by the back-end and front-end. These three components are modular and can be run on the same or separate physical systems, providing flexibility to deployments and reducing the attack surface of the back-end. The back-end is the primary component to interact directly with the hypervisor.

Aspects described herein leverage technology termed IntroVirt®, offered by Assured Information Security, Inc., Rome, N.Y., of which IntroVirt is a registered trademark. This technology is described in commonly-assigned, copending U.S. application Ser. No. 14/525,803, entitled VIRTUAL MACHINE INTROSPECTION FACILITIES (filed Oct. 28, 2014) and is hereby incorporated herein by reference in its entirety. IntroVirt® may be implemented as an advanced Xen®-based hypervisor with virtual machine introspection (VMI) features (Xen® is a registered trademark of Citrix Systems, Inc., Fort Lauderdale, Fla., U.S.A.). IntroVirt® provides facilities that allow aspects described herein to monitor guest code and generate the effects necessary to deploy and install updates, including security updates. IntroVirt® includes a Windows® API known as WintroVirt that provides routines that reduce the semantic gap between hypervisor and guest execution context for monitoring and modifying the guest state (Windows® is a line of operating systems offered by Microsoft Corporation, Redmond, Wash., U.S.A., and is a trademark of Microsoft Corporation). Extending this as described herein, desired effects are introduced to the guest to deploy the update and initiate its installation. A technique termed "execution injection" is provided that temporarily commandeers existing guest system thread(s) to perform actions desired by a deployment tool without introducing external code into the guest. Security and other types of updates may be deployed for installation to guest virtual machines directly from a hypervisor without the need for a dedicated update agent.

Aspects described herein were developed and tested for compatibility with some recent versions of the Windows® line of operating systems, however the flexible approach taken during development renders the technology largely compatible with other versions of Windows®. Furthermore, concepts and capabilities described herein may be expanded to include support for other operating systems, such as Linux-based operating systems, third-party application software, and automatic testing of updates. Such support can facilitate enterprise scalability and integration with major cloud and virtualization partners.

Aspects of introspective hypervisor technology may be leveraged to help achieve update deployment and installation objectives, for instance to deploy and install security or other types of updates directly to guest virtual machines. The IntroVirt® technology may be implemented as a highly-extensible type-1 hypervisor and leveraged to monitor, control, and modify the execution of software running within virtual machines. It can exercise the latest virtualization features such as extended page tables (EPTs), which can be used to intercept code execution in a large number of configurations. The exported WintroVirt API supports a number of operations on guest virtual machine software that are designed to minimize and shield the developer from the limiting effects of the semantic gap. "Semantic gap" refers to the difference in context between code executing as part of the hypervisor and code executing as part of a guest virtual machine. From the hypervisor's perspective, the interface to the operating system generally offers little semantic knowledge regarding the structures used by the system, the current activity taking place, or the current system status. However, the system may be engineered to understand the details of the system state and activity taking place on the system.

An example of such an architecture in a virtual environment is depicted in the system of FIG. 1 incorporating a deployment tool as described herein. System 100 includes physical hardware 102 (CPUs, memory, I/O devices, etc.) 'owned' by hypervisor 104 and dispatched by hypervisor 104 to guest systems (virtual machines in this example) 106 and 108. Virtual machine 106 is a privileged guest virtual machine (VM). In this example, hypervisor 104 is a modified version of the Xen® hypervisor, and privileged guest virtual machine 106 is a paravirtualized guest machine known as Dom0. Virtual machine 108 in FIG. 1 is the virtual machine to which an update is to be deployed as described herein (also referred to as the "target guest virtual machine"). Privileged guest virtual machine 106 includes library 112, libIntroVirt, which is an interface library providing communication facilities for interaction between privileged guest virtual machine 106 and hypervisor 104. In some embodiments, libIntroVirt 112 is guest-operating-system agnostic, and interfaces one or more higher-level introspection libraries (e.g. library 114) with hypervisor 104, enabling them to communicate with each other. LibWintroVirt 114 provides introspection and other features specifically tailored for a respective operating system, in these examples the operating system of guest virtual machine 108. In the example of FIG. 1, an operating system of target guest virtual machine 108 is a Windows®-based operating system. Accordingly, libWintroVirt 114 has the ability to parse several Windows®-based operating system kernel objects.

Library 114 makes use of libIntroVirt 112 by leveraging and extending its functionality to allow tools to examine the environment of guest virtual machines. The tools may be developed to perform introspection and other tasks using introspection libraries. The tools can utilize data structure parsers of an appropriate introspection library, such as libWintroVirt to parse system calls intercepted and passed to the privileged guest for handling. The parsers can perform various functions like extracting information about the target guest virtual machine and/or about intercepted introspection events themselves. In some examples, a tool implements its own parser(s) when, for example, parser(s) for a particular system call or data structure do not exist in an introspection library like libWintroVirt. Capabilities enabling the interception of system calls and the modification of guest state resources such as registers, memory, and, indirectly, the hard disk, are thereby provided. These libraries allow the tools to interact with guest code and minimize the limiting effects of the semantic gap—the disparity of context between code running in the hypervisor and that within guest virtual machines.

An example tool as depicted in FIG. 1 is a deployment tool 118 incorporating aspects described herein, such as functionality of the back-end component. The deployment tool 118 runs on the privileged guest machine to perform deployment of updates to target guest virtual machine 108 and to perform other functions. Deployment tool 118 is depicted as a single entity in FIG. 1, though it should be understood that deployment tool 118 may actually represent one or several separate tools to perform functions described herein.

The three primary components—the back-end, front-end, and database—are described in further detail below with reference to FIG. 2. As an overview, the back-end is the conceptual hub of activity in the system. It receives job information from the database and manages the tool(s) 118 for monitoring and interacting with guest virtual machine activity. The front-end presents users with a graphical user interface (GUI) for managing updates, virtual machines, and jobs. In some embodiments, the front-end reads and writes to the database only, rather than to the back-end, for example. The database stores available update information, and information about virtual machines and update jobs. Both the front-end and the back-end use the database to assist in their provided functionality. The back-end, front-end, and database may run on the same or different machines, and may be part of the same or different components. Thus, functionality of one or more of these components may be implemented as part of one or more of the others, if desired.

In some embodiments, the back-end carries out a majority of technical tasks supported by the update deployment/installation architecture described herein. Specifically, the back-end may be responsible for at least one or more of the following activities which are described in further detail herein: determining guest virtual machine patch levels, determining the list of available updates, deploying/transferring updates to guest file systems, initiating installation of an update by launching an update installation application, protecting the update installation application from malicious code, and verifying correct installation of updates.

The back-end software can query the database for information relating to the installation of updates in guest virtual machines. In the embodiment of FIG. 1, the back-end runs from the privileged domain and is isolated from adverse effects that may occur in the front-end and database components, as well as the guest virtual machines. The database stores configuration and job information used by the front-end and back-end components. The stored information primarily relates to the monitored virtual machines, available updates from providers of guest operating system software and/or applications running thereon, information on update jobs such as included updates and target virtual machines, and configuration information for each back-end. Because aspects described herein may support multiple hypervisors, in some embodiments there may be multiple back-ends, each dedicated to a different one of those hypervisors.

Figure 2:
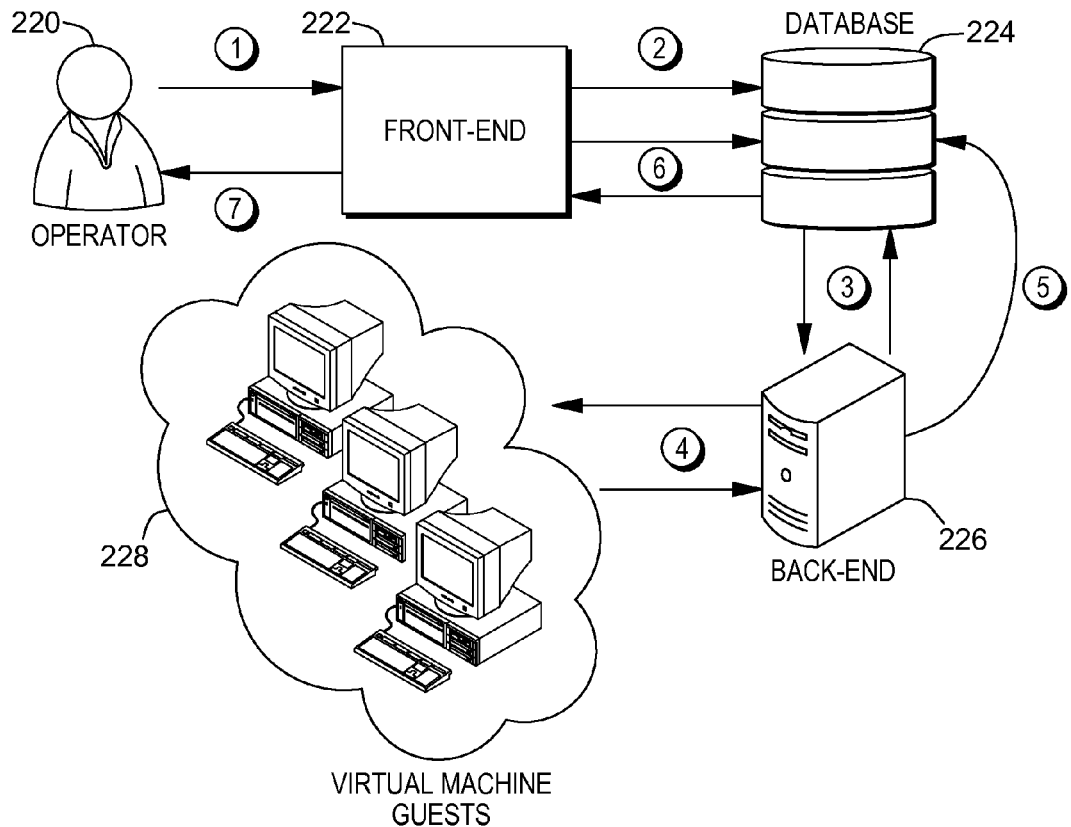
FIG. 2 depicts an example operational flow between back-end, front-end, and database components for deploying and installing an update, in accordance with aspects described herein.

FIG. 2 depicts an example operational flow between back-end, front-end, and database components for deploying and installing an update, in accordance with aspects described herein. FIG. 2 shows the three high-level components of the architecture (back-end, database, and front-end) in relation to each other and a user and the subject guest virtual machine(s). An operator/user 220 can utilize the interface provided by the front-end 222 to create (1) an update job. The front-end 222 populates (2) the update job information in the database 224. The back-end 226 queries and communicates (3) with the database 224 for new update jobs. The back-end 226 executes update jobs by communicating (4) with guest virtual machines 228, which entails, in some embodiments, deploying updates and initiating their installation on guest virtual machine(s) 228 through the hypervisor of the host system 100.

The back-end 225 periodically updates (5) the database 224 with job status, i.e. the status of the deployment/installation of updates on the guest(s) 228. Meanwhile, the front-end 222 communicates (6) with the database 224 to obtain job statuses therefrom and provide (7) the statuses to the user via the interface.

The back-end executes various technical tasks to deploy and initiate install of updates to guest virtual machines. In some embodiments it determines guest virtual machine patch levels, generates a list of available updates, transfers update files to guest virtual machine file systems, initiates update installation, protects the update process, and/or verifies update installation. The following details some technical aspects of the back-end including the innovations to effect change within guest virtual machines from the hypervisor. Back-end tasks may be implemented, in some embodiments, as an individual tool developed to leverage facilities provided by IntroVirt®.

Execution Injection:

The back-end performs technical tasks involved in transferring files to the guest's running virtual hard disk and initiating installation of the update. Both are achieved by invoking guest operating system functionality. A method of introducing effects to guest virtual machines was developed to accomplish this and is referred to herein as execution injection. Execution injection can produce the same or similar effects as those produced by code injection, but without introducing new code (for instance instructions for execution) into the guest. Avoiding the injection of external code into guest virtual machines sidesteps at least two weaknesses associated with more traditional approaches. First, no compiling is required, and second, code detection techniques in the guest by malware will be unsuccessful.

Execution injection is achieved by temporarily commandeering an existing guest system thread and causing it to perform actions desired by the caller—the back-end in this case. Those actions amount to making a sequence of system calls/function calls to achieve a clearly-defined goal. For example, take the task of writing a file to a guest's disk: From an application's perspective, the key elements required to achieve this are invoking a system call to open a file for writing, a system call to write data to that file, and a system call to close the file handle. Execution injection achieves this result by taking an existing guest application thread in an arbitrary state and relocating it to perform a system call to open the file, followed by one or more system calls to cause the update data to be written to the file, and capped by a system call to close the file. After the injection is complete, the captured thread may be placed at its original location, prior to redirection, and execution can continue as normal. This approach maximizes use of on-site guest code and eliminates the need to introduce foreign code into the guest.

Invoking arbitrary system calls involves two steps. First, the instruction pointer, which is the current location of execution in code being executed, is placed at the address of the desired system call. This action can be completed with a single function call to the WintroVirt library, as an example. If the system call does not require any arguments, setting the instruction pointer alone is sufficient for invoking the system call. For system calls that require arguments, these can be provided in the same manner used by normal code. The execution injection technique can save the register and stack states, replace their contents with the desired arguments, and resume the guest to execute the system call. When the system call returns, execution of the guest is intercepted and the register and stack states may be returned to their original values or the hypervisor may cause the guest to make further system call(s).

By way of specific example, upon a virtual machine exit (VMEXIT), the hypervisor takes over control to perform any of various tasks. If the desire is to write a file, e.g. an update, to the guest, an existing running thread on the guest is used to accomplish this. In a typical guest virtual machine, there are several (usually 30-60) threads running, each executing in a respective privilege mode such as user-mode or kernel-mode. The threads make various function/system calls as part of their execution in order to perform functions such as reading/writing file data, opening/closing files, sending/receiving network traffic, or many others. The hypervisor can select a thread for execution, preferably one with administrative privileges. In some examples, the hypervisor selects the thread and hooks system call(s) made by the thread to the operating system, thus invoking hypervisor involvement. The progression of thread execution can then be redirected by the hypervisor modifying the instruction pointer associated with the thread to position execution at the location of a desired system call by the guest operating system. Example system calls relevant for purposes of deploying an update in accordance with aspects described herein are calls to perform one or more of: opening/creating a file, allocating virtual memory, reading virtual memory, writing to the file, and closing the file. Accordingly, the instruction pointer can be changed to the location of a function appropriate to open a handle to a file, which may be an existing file or a new file. The hypervisor can write data containing arguments, such as name of the file to write, to a stack or other guest virtual machine component for passing to the open-file function. When the hypervisor resumes execution of the guest, execution proceeds by invoking the system call pointed-to by the instruction pointer. On the return of the system call, execution can again trap to the hypervisor. At this point, the hypervisor can direct the thread's execution to various other system call(s), trapping their returns, to cause the update to be written to the opened file. These system calls may involve requesting allocation of a buffer space (such as virtual memory) or other guest virtual machine component and writing data of the update to the component of the guest virtual machine. The hypervisor may supply the necessary parameters for making these system calls to allocate memory and write the data to the virtual disk, and modify the instruction pointer to change its value to the address(es) of these functions. The call to the write-file function can cause the guest to write the data provided to the component (e.g. the buffer in guest virtual memory) to the open file. The process to write the update data may involve a sequence of system calls to write different portions of data, in which the returns from these system calls are intercepted and the execution of the thread is redirected one or more times back to the write function to write update data until the entire update is written from the component to the guest virtual disk. Finally, the hypervisor can redirect the thread to invoke a function to close the file handle, resume execution of the guest, and again trap the return. Upon trapping, the original instruction pointer value, which is the value prior to commandeering the thread to open the file and write the update data, can be restored to the saved instruction pointer value, various other saved data (such as saved stack data) can be restored, and the guest can be resumed to proceed with execution as though nothing abnormal occurred. As far as the guest application can tell, it proceeded normally with its execution and has no knowledge that it performed any of the above activities to open and write to a file.

Execution injection enables the injection of arbitrary functionality into guest virtual machines while minimizing the footprint of external tools. This technique can be used by the ivpushfile and ivexec tools described herein.

Guest Patch Level Determination:

Initially, the back-end can determine the patch level(s) of the target guest machine. Patch, or update, level reflects which updates have already been installed to the guest. This information is useful to inform which updates are both appropriate and available for a given machine.

Various technical approaches can be used by the hypervisor to determine the patch level(s) of a guest virtual machine. As one example, executable files loaded into main memory (i.e. RAM) may be parsed to observe file version numbers. The WintroVirt library can provide an ability to parse portable executable (PE) files, for instance, in which PE files, including executables and dynamic link libraries (DLLs) loaded into the guest virtual machine's memory are scanned. Their version information may be cross-referenced with files in the database. This technique may successfully determine a subset of installed updates, albeit only those of PE files loaded into memory when the virtual machine is examined. The set of loaded PE files can vary greatly depending on the system configuration, workload, and resources. Since this technique observes PE files loaded into memory (i.e. those in use) it would not identify updates for those executables residing only on disk at the time of examination. In some embodiments, this technique is used as a fallback approach if the following two approaches were insufficient.

Another example of an approach for determining the patch level(s) of the guest is to parse the on-disk update database files, such as the Windows® Update database file on Windows®-based machines. While feasible, a potential downside is that the file size tends to be relatively large. It was found that the update database file is at least 200 megabytes on many systems, with the possibility of growing much larger. Reading and parsing a file this large, especially across many virtual machines, may be prohibitively demanding.

Yet another approach is to parse configuration information of the guest virtual machine, such as an in-memory copy of the Windows® Registry. On Windows®-based systems, there exists a registry key containing a list of updates installed since the system was installed. This can be queried directly via IntroVirt® due to WintroVirt's ability to parse the in-memory copy of the registry. A tool referred to herein as ivsurvey may be leveraged to query the registry keys and values corresponding to installed updates.

In the latter approach, testing showed that ivsurvey typically finished in under a second for an arbitrary guest virtual machine. The performance of ivsurvey, combined with the relatively high granularity of its results, may position the tool to be the preferred one to use. The ivsurvey tool may be called directly from the back-end to query the patch level of running virtual machines.

Determination of Applicable Updates:

Facilities provided herein allow users to select the updates to install on guest virtual machines. A list of applicable updates is enumerated by comparing the output of the ivsurvey tool described above with the updates populated in the database as being applicable to the virtual machine. In this regard, the database is populated with known updates, such as those issued by the provider of the guest operating system and/or other software executing in the virtual machine. The list of known updates may be updated periodically, for instance on a monthly basis, as updates are released. The result of the comparison between ivsurvey and the updates in the database yields a list of uninstalled updates for the guest virtual machine. Determination of the applicable update(s) for a guest virtual machine is carried out by the back-end and handed off to the front-end where the user can select which of the updates are to be installed using a convenient interface such as the one depicted in FIG. 2.

Update File Transfer:

Update files are deployed onto a guest virtual machine's file system in order to initiate their processing by the guest system. In some embodiments, functional requirements may dictate that placement of update files cannot rely on network communications, nor may files be written directly to the virtual hard disk due to the disk only being writable to a single entity at a time, namely the guest operating system when the machine is running.

The execution injection technique discussed above satisfies these requirements, enabling a user-selected update file to be written to disk via running processes. As described above, deployment of the update may be accomplished by causing an existing privileged thread to invoke various system calls. For a Windows®-based virtual machine, the following system calls may be used:

ZwCreateFile: This function is responsible for opening files and returning handles to user processes (the NtCreateFile function is the user-mode equivalent to this);

ZwWriteFile: This function writes data to a file opened for writing. It takes as parameters a file handle and a pointer to data that is to be written to the file; and ZwClose: This function closes an open file handle.

Other system calls may also be leveraged. It some embodiments update data is placed into allocated virtual memory page(s) and the data is written from there to the opened file using the ZwWriteFile call. System calls such as ZwAllocateVirtualMemory and ZwReadVirtualMemory may therefore be used at some point to accomplish this, as described in further detail below.

An IntroVirt® tool referred to herein as ivpushfile is used to write update files to disk. The tool takes the following parameters, as examples: (i) an indication of the target virtual machine of the host system, (ii) an indication of the location of the update file to be written to the guest, and (iii) an indication of the file system location to which the file is to be written. Transferring files to the guest disk in this way is reliable, efficient, and free from significant dependencies on guest capabilities. In some embodiments, the ivpushfile tool is called directly from the back-end to write selected update files to the file systems of guest virtual machines.

A detailed example of execution injection to write the update file is now provided. It may be suitable for the hypervisor to place the update data in any of various buffer(s), data structure(s), etc. of the guest virtual machine. Some such buffers may already exist in the guest virtual machine, for instance as part of a stack thereof, while others may require other system call(s) to be made by the guest to create or instantiate them. In this particular example, a buffer is allocated for data structures and the update file data by injecting call(s) to ZwAllocateVirtualMemory. This buffer in virtual memory page(s) may be advantageous when a more complicated structure is passed into the guest virtual machine as a pointer during a system call. Such a buffer may be allocated to hold the update data in order to avoid running out of stack space, for instance.

Initially, a suitable process is identified for redirecting execution thereof. The process may be identified based on hooking a system call, for instance. If the user specifies a process filter and/or desires a process with administrative ("Admin") privileges, then identification and selection of a thread for which execution is redirected may be based on that. Otherwise, the selection of the thread may made arbitrarily.

When a process for redirecting has been identified, an identifier is noted. This can be, for instance, either the thread ID (TID), the kernel stack pointer, or any other identifier that uniquely identifies the thread. The identifier may be noted to ensure that subsequent system calls occur within a single thread of the guest, for a consistent context.

To create a virtual memory component (e.g. buffer) of the guest into which update data may be written, a call to ZwAllocateVirtualMemory may be injected. This may be done by updating the instruction pointer associated with the thread to point to the ZwAllocateVirtualMemory function, registering a hook on the function's return (if not already hooked), and resuming the guest to make the call to the function. The return of the function may indicate virtual memory pages(s) that were allocated, and these can be noted by the hypervisor or a component thereof. In some embodiments, the hypervisor causes the guest to access one or more locations (bytes) from each of the allocated page(s), for instance by redirecting execution of the thread to a ZwReadVirtualMemory function. This would ensure that the operating system commits the allocated virtual memory, rather than just reserving it.

The allocation of the page(s) provides a working buffer. In some embodiments, this is then mapped into ivpushfile's memory. The destination file may be opened by injecting execution redirection to a ZwCreateFile function, which may be performed before or after allocating the virtual memory above. Based on returning from the ZwCreateFile function, a loop can be entered to memory-copy portions of the source update file data into the shared memory buffer and injecting a redirection to the ZwWriteFile function call until the entire update data file is written. A ZwWriteFile redirection may be performed for each and every block of memory to be copied into the buffer(s), which might typically be single memory pages ("4 KB" pages), though it could be any desired size. In some examples, for instance, and if desired, a single buffer big enough for an entire update may be allocated and a single call to ZwWriteFile can write the entire update from the buffer to the opened file, though it may be desired to use the page approach to avoid complications.

Based on the guest writing all of the update data, execution can again be redirected to call(s) to close the file and free-up the allocated memory. The above-described implementation may be considered a state machine, with the order of events as follows: ALLOCATE_MEMORY, PAGE_IN_MEMORY, CREATE_FILE, WRITE_FILE, CLOSE_FILE, FREE_MEMORY. It is understood that techniques for hooking the returns from the system calls to accomplish the above may be registered in order to break execution of the guest and return processing to the hypervisor for a next execution injection.

The call to the function to write update data from the component of the guest to the opened file can happen multiple times, and the size of the allocated buffer may be configurable at compile-time.

It is understood that there are other ways of achieving provision and writing of the update data to the guest's opened file. For instance, the stack region may be used as the temporary buffer for the update data to be written to the opened file. In these situations, it may be the case that a much smaller update data portion size is utilized, meaning that a greater number of transfers and writes of the update data is required, which may slow down the copying of the update data to the guest.

Prior to the redirecting execution, a copy of the original stack and register data may be saved, and the these components may be overwritten with desired system call numbers and parameters. When the injected call returns (or after a sequence of injected calls is completed), the instruction pointer may be set back to its original location (the userland system call entry point), to trigger another system call to occur that can be intercepted and modifies. When an injection sequence is completed, the original stack and registers may be restored to reset the thread back to where it was before injection was initiated.

Update Installation:

Execution injection is again leveraged to launch an update installation application of the guest virtual machine to install an update after it has been transferred to the guest's file system. In Windows®-based systems, there is an executable named wusa.exe that is the Windows® Update Standalone Installer (WUSA) program designed to handle installation of standalone updates for the operating system. Utilizing an in-guest update installation application to install updates removes the need to reverse engineer the update process on each operating system platform, ensures that updates are installed correctly, and encapsulates the update into a single process that can be protected from the effects of malicious software (see below).

The update installation application may be launched using execution injection targeting a system call to create a process for executing the update installation program. On Windows®-based systems, this system call is known as ZwCreateProcess. This call enables an application to request creation of a new process from the operating system. Execution injection described herein causes a thread to call ZwCreateProcess and passes the appropriate parameters required to launch WUSA such that it processes the update file placed on the system as a result of the prior execution injection to write the update to the virtual disk. The injected functionality is equivalent to invoking the following command, as an example, from a command prompt on a Windows®-based system for an update called kb12345.msu: C:\windows\system32\wusa.exe C:\kb12345.msu /quiet.

Administrator Privilege:

By design, an update installation application, such as WUSA, may require administrative privileges in order to install updates to the system. When the current user of a guest virtual machine is an administrator, any thread within any process is suitable for execution injection to launch the installation of update(s). However, to maximize compatibility with existing network deployments in which users typically operate with reduced privileges, the capability may assume that the current user is unprivileged. What is desired, therefore, is a suitable and robust solution to launching the update installation application with sufficient privilege. If there is a published or otherwise known way of identifying privileged processes executing on the virtual machine, then that may be leveraged to identify the process to launch the update installation application, and this will generally work without issue.

For security or other reasons, software makers may not publish ways of identifying privileged processes that are guaranteed to have sufficient permissions to launch the update process. Even execution injection using processes running as "System" when targeted for execution injection may cause occasional system crashes seemingly due to the possibility that administrator processes may run with reduced privileges. To avoid these issues, it may be possible to manually launch a process in the guest virtual machine as administrator and target that process during execution injection. However, this approach may not be possible as a general proposition based on security measures of the guest operating system. With particular regard to Windows®-based systems, however, research showed that processes operating with the security identifiers (SIDs) "S-1-5-18", referring to a well-defined account for "Local System", met the requirements of running with sufficient privilege to install updates. Execution injection can therefore target one of these processes to initiate the installation of a deployed update because they meet the requirements for initiating a privileged update installation process.

The functionality described above to initiate the update installation application process may be developed into an IntroVirt® tool referred to herein as ivexec, which is called by the back-end to install update file(s) after they have been deployed by ivpushfile as described above.

According to aspects describe herein, execution injection may be leveraged at least twice to deploy and initiate installation of an update file—once for deploying the file by causing it to be written to guest virtual disk and again for invoking a process to install the deployed file. Once an update file is determined to be applicable to a virtual machine, it is deployed to a file on the virtual disk while the virtual machine is running. Then an update installation executable on the guest is launched that knows how to process the update file, extract it, and perform any necessary housekeeping that the operating system desires for a clean update installation. An executing thread (such as a thread executing a familiar program like Notepad or Word) is caused to invoke the ZwCreateProcess function to launch the update installation executable for installing the update, the name of which is passed to the update installation executable. The ZwCreateProcess function executes to create the update installation application process and the thread making the call to ZwCreateProcess can be restored to an initial execution point (a prior to commandeering to launch the update process). The hypervisor can hook the return from the ZwCreateProcess system call, restore the instruction pointer value for the thread launching the update installation application process to its prior value (which was saved when execution injection was initiated), and resume execution of the thread as if nothing abnormal occurred. In the meantime, the update installation application process has been launched and is executing to install the update previously written to guest virtual disk.

While just about any process has the ability to write a file to disk, it may be preferred to use a thread with administrative privileges, such as one executing in kernel-mode, to perform the update deployment.

Protection of Update Installation:

Malicious code is sometimes capable of using process termination to kill a process, such as an update installation application to prevent the application from receiving/applying any updates. Alternatively, code injection may sometimes be used in a more malevolent fashion, such as to inject functionality into the update installation application to cause the update to appear to have succeeded when it had not. Thus, according to aspects described herein, the update installation application process may be protected from effects of malicious code, including process termination and code injection. This may be accomplished by monitoring system calls and preventing access to a specific resource.

For example, the ivexec tool described above may be extended to provide protection to the update installation application after it is launched. Ivexec can register a hook on system calls from some/all running processes of the guest virtual machine and examine all invocations of the system call to open the update installation application process (on Windows®-based systems, this system call is the ZwOpenProcess system call). By way of example, if a process requests to open the update installation application process with an access mask including the bit signifying PROCESS_TERMINATE, ivexec can silently modify the mask to another value, such as PROCESS_QUERY_INFORMATION. A PROCESS_TERMINATE is sufficient for both terminating a process as well as injecting code into the process and therefore may be the vehicle used by malicious software. By modifying the bit, the handle returned when the system processes the request is insufficient to allow a future call to terminate or inject code into the update application process. Thus, ivexec can prevent both forms of malicious code effects by preventing processes from opening the update process with elevated privileges.

Update Verification:

Aspects described herein can additionally verify that updates are correctly installed by parsing guest virtual machine configuration information (such as the in-guest-memory copy of the guest Windows® operating system registry) after installation is complete. The locations used to determine guest virtual machine patch level(s) may be checked again in order to verify that an update has been correctly installed onto a system. The back-end can then update the job status in the database so that it can be reported to the user via the front-end. If an update was not installed correctly, an alert may be generated in the job status and the user may be notified.

Database:

The database stores data related to update bulletin information, virtual machines running under the update deployment and installation platform described herein, and job information and status (i.e. update installation). The database is queried and written to by both the front-end and back-end components. The front-end queries the status of virtual machines, including the patch level results from ivsurvey, and displays them to the user. The user has the option of creating jobs that specify the installation of updates to groups of one or more virtual machines. The front-end writes those jobs to the database, where they are picked up by the back-end. The back-end periodically checks the database for new jobs, initiates update deployment and installation on guest virtual machines, and updates the status of both virtual machines and jobs in the database.

The database can also contain information regarding security bulletins released by a provider of the operating system or other software of the guest virtual machine. The information may be stored in a table that is updated as the bulletins and corresponding updates are released. This typically occurs monthly, and the updates to the database enable the back-end to properly determine whether any patches are available for guest virtual machines. A Python script may be run on the bulletin information to update the database tables.

Front-end:

The front-end is implemented as a web application in some embodiments that allows users to manage the installation of updates to guest virtual machines. The front-end may be written using a framework such as Flask (available at flask.pocoo.org), and can be run on a machine with Python installed, for instance a Python interpreter installed.

Figure 3:
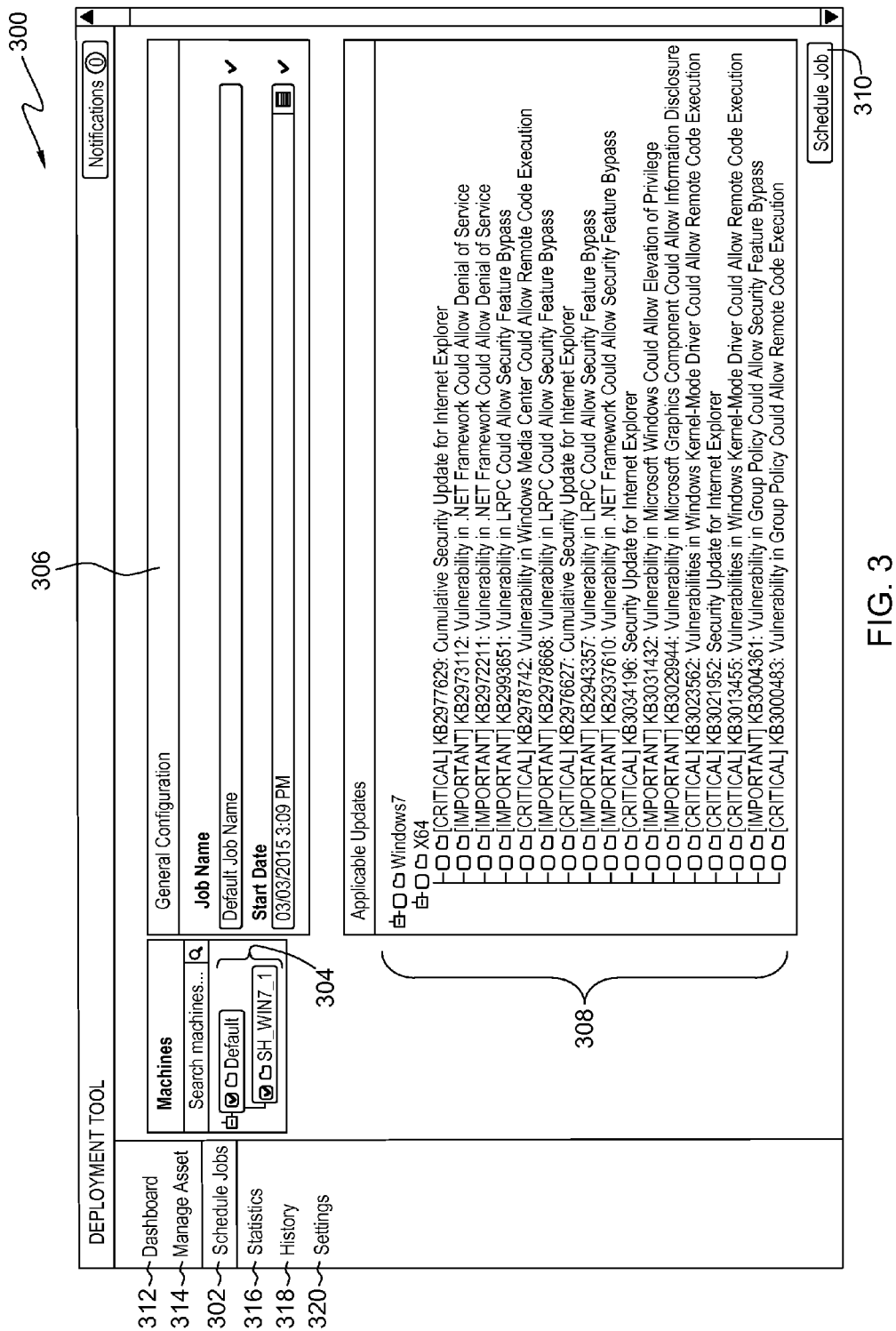
FIG. 3 depicts an example front-end interface for use in viewing and selecting applicable updates for installation to a guest virtual machine, in accordance with aspects described herein.

FIG. 3 depicts an example front-end interface for use in viewing and selecting applicable updates for installation to a guest virtual machine, in accordance with aspects described herein. The interface 300 of FIG. 3 for the deployment tool shows a Schedule Jobs panel, in which a list 304 of virtual machines is presented for selection. Only one virtual machine is included in FIG. 3. Based on selecting one or more virtual machines, General Configuration information 306 is definable for the job. This includes a job name and job start date/time, and these may be specified by the user or set to a default value. Below General Configuration information 306 is a list of available updates 308 to the selected virtual machine(s). Here, the virtual machine runs the 64-bit version of the Windows® 7 operating system and presents a list of 17 updates. The user selects the desired update(s) for including in this job and selects a Schedule Job button 310 to schedule the job to be performed at the specified start date/time.

Other panels that may be provided for the Deployment tool include:

Dashboard 312—This presents, as examples (i) server statuses (hypervisor/privileged virtual machine status, and update server status), (ii) indications of running virtual machines and their statuses, (iii) number/nature of updates pending approval and arranged by operating system/software, and (iv) job listings for virtual machines under the purview of this deployment tool.

Manage Assets 314—This panel many be used for management of machines, machine groups, jobs, patch policies, updates, and servers, as examples. It may provide inspection of current assets, modification of assets, and addition/removal of assets, as examples.

Statistics 316—This panel presents any desired statistics related to the system, such as performance of virtual machines and/or the hypervisor, or statistics regarding deployment and/or installation of updates.

History 318—This panel can present a history of update deployment/installation.

Settings 320—This panel can present, inter alia, configuration settings for back-ends and allow the user to add and configure additional back-ends.

The front-end supports actions by users, examples of which can include the following: obtaining a quick snapshot of system state and activity on the dashboard, viewing the update status of virtual machines, creating update jobs by specifying a set of update(s) and a set of virtual machine(s), and viewing the current status of update jobs. Further features of the front-end are apparent from the Installation and User Manual portions of the description below.

Described herein are facilities for deploying and initiating installation of updates, such as security updates, to running virtual machines directly from a hypervisor. A front-end allows users to interface with hypervisor capabilities and manage the deployment and installation of updates to guests running on the hypervisor, which is advantageous for modern virtualization and patch management solutions. The design may be compact, with just a few components, and modular enough to allow the components to be run on machines separate from the hypervisor. This creates flexibility and also minimizes the attack surface.

Performance Metrics:

A number of metrics were collected to gauge performance on a server used for development and testing. The common test configuration was as follows:

Test machine: PowerEdge® R720xd, offered by Dell, Inc., Round Rock, Tex., U.S.A. (of which PowerEdge is a trademark) with 64 GB of RAM and Intel® E52660 CPU (8 cores, 16 threads) (Intel is a trademark of Intel Corporation, Santa Clara, Calif., U.S.A.)

Guest virtual machine: Fresh install of Windows® 7 x64 with SP1 (i.e. no additional security updates). No user activity resulting from system input (i.e. logged-in, idle)

Security Update: KB2976897, File size: 809,280 bytes

Test #1—The first test measured the time to manually install the single security update on the guest virtual machine exactly as a user would manually install the update i.e. by logging into the operating system and using the desktop interface to invoke installation of the update. This test was run at a time when facilities for deployment and installation of updates as described here were not operational. Test 1 serves as a control to further benchmarks. The time required to complete was 27.27 seconds.

Test #2—The second test measured the time (i) for the deployment tool to determine patch level, deploy the update, and initiate installation, (ii) for the update installation application of the guest to install the single security update to a single guest virtual machine, and (iii) for the deployment tool to verify the update post-installation (described below). The breakdown of the time taken at each step is as follows:

| Description | Time taken to complete |
| --- | --- |
| Determine patch level with ivsurvey | 8.37 seconds |
| Push update to guest with ivpushfile | 0.98 seconds |
| Launch and protect update process with ivexec | 46.14 seconds |
| Verify patch installation with ivsurvey | 10.17 seconds |

Test #3—The third test measured the time (i) for the deployment tool to determine patch level, deploy the update, and initiate installation on 10 virtual machines simultaneously, (ii) for the update installation applications of the guests to install the single security update, and (iii) for the deployment tool to verify the updates post-installation. Below is a breakdown of the time taken at each step:

| Description | Time taken to complete |
| --- | --- |
| Determine patch level with ivsurvey | 9.46 seconds |
| Push update to guests with ivpushfile | 1.50 seconds |
| Launch and protect update processes with ivexec | 259.13 seconds |
| Verify patch installations with ivsurvey | 14.78 seconds |

As noted previously, many existing solutions are agent-based and, as such, are subject to the effects of malicious code, identification via binary signature, and the negligent or potentially malicious actions of the user. Further, solutions that run using the hypervisor may still rely on an agent for update deployment, and solution support is limited to proprietary products. In contrast, aspects described herein provide an agentless, hypervisor-based solution for update deployment capable of working with open-source and other virtualized infrastructures.

Various opportunities exist for introducing aspects described herein to potential beneficiaries of the technology, including:

- Integrate with private cloud and virtualization solution providers such as Rackspace Inc. (San Antonio, Tex., U.S.A.), VMware Inc. (Palo Alto, Calif., U.S.A.), or Amazon.com Inc. (Seattle, Wash., U.S.A.). Cloud providers can ensure all virtual machines, even those without functional networking, can receive security patches and be automatically kept up-to-date from the latest attacks;
- Provide to large patch management vendor company such as Trend Micro Inc. (Tokyo, Japan), Websense, Inc. (Austin, Tex., U.S.A.), Intel Security Group (formerly known as McAfee Inc., now part of Intel Corporation, Santa Clara, Calif., U.S.A.), EMC Corporation (Hopkinton, Mass., U.S.A.), or VMware;
- Sell as a commercial, off-the-shelf software package;
- Provide to governmental channels as an operational environment within government;
- Provide to an operating system provider for integration into the operating system's patch management service—this would enhance the granularity of protection offered to update installation from the hypervisor.

Functional capabilities of technology described herein advantageously include the ability to:

- Change guest operating systems directly from the hypervisor without relying on user interaction or network communications;
- Apply security and others updates to running systems without causing significant disruption to normal system users;
- Protect the update installation application from effects of malicious code; and
- Support running non-critical components outside of the privileged domain where the back-end resides.

The above aspects and other approaches taken herein to update management have a number of advantages over current patching methodologies. For instance, deployment of the update from the hypervisor, as opposed to relying on an in-guest software agent, for instance, reduces susceptibility of the in-guest software agent to effects of malicious code. The current solution uses the hypervisor, which is largely impervious to these effects due to the separations provided by hardware virtualization extensions built into modern processors. Furthermore, even virtual machines without functional networking can benefit from the application of updates by way of the hypervisor as described herein. Network resource consumption is reduced relative to a centralized server pushing updates to several machines.

In addition to the above, no external code for deploying the update is introduced into the guest virtual machine to write the file(s) or launch processes. No compilation is necessary and no code signatures can be created for detection by programs in the guest. This leaves the target guest virtual machine intact and malicious code that may exist in the guest without the opportunity to use binary signatures to identify and avoid the technology described herein to deploy/install patches. The update is transparent to the virtual machine, providing a seamless and non-disruptive installation of the update.

A graphical user interface-based front-end may also be provided to present to administrators features including an intuitive view and management of the host and guest machines, available updates, and running jobs. Further, installation of updates can be scheduled to occur at arbitrary times by way of scheduled update jobs, thus reducing the resource drain on virtual machines during normal use and hours.

Figure 4A:
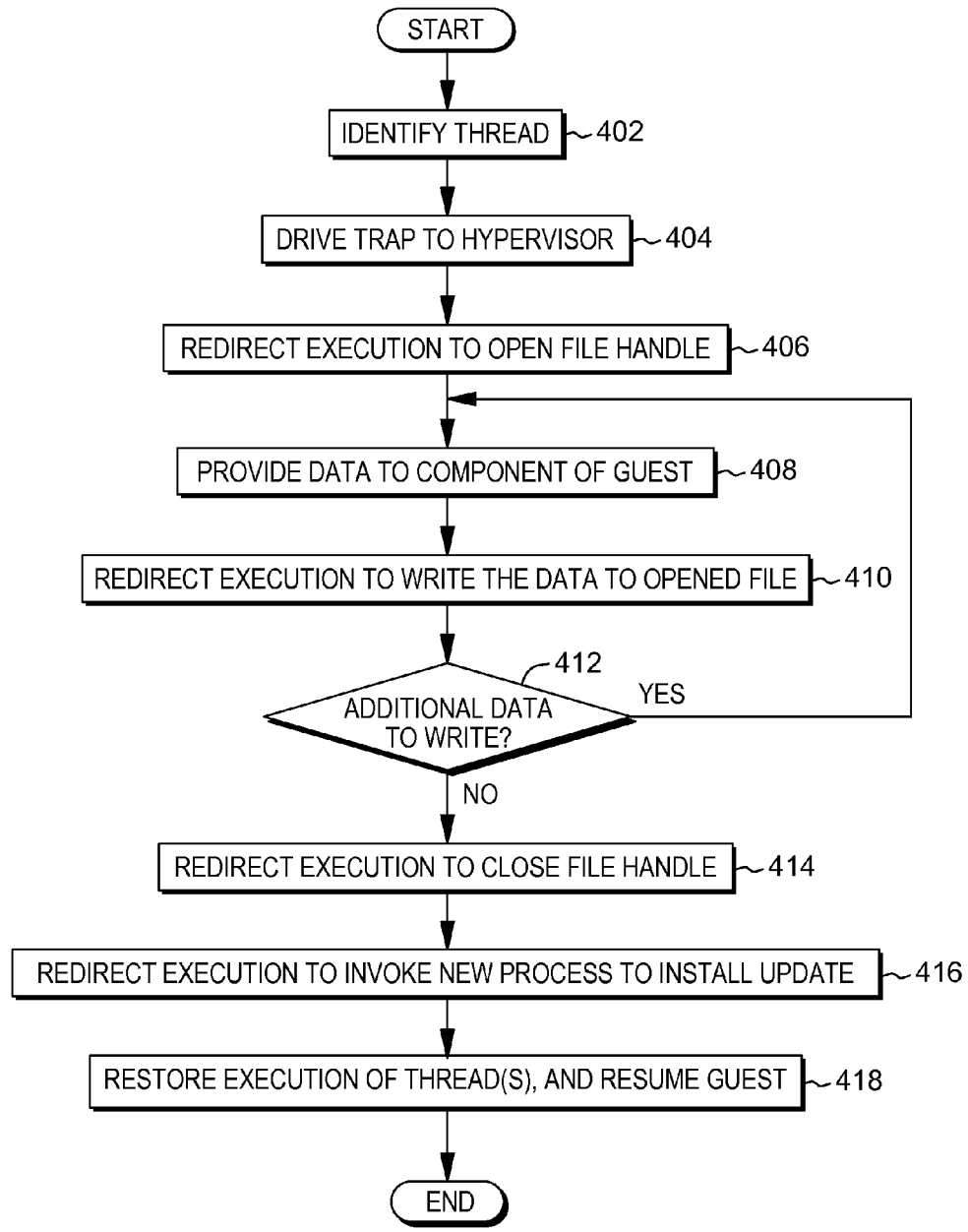
FIG. 4A depicts an example process for deploying an update to a guest virtual machine, in accordance with aspects described herein.
Figure 4B:
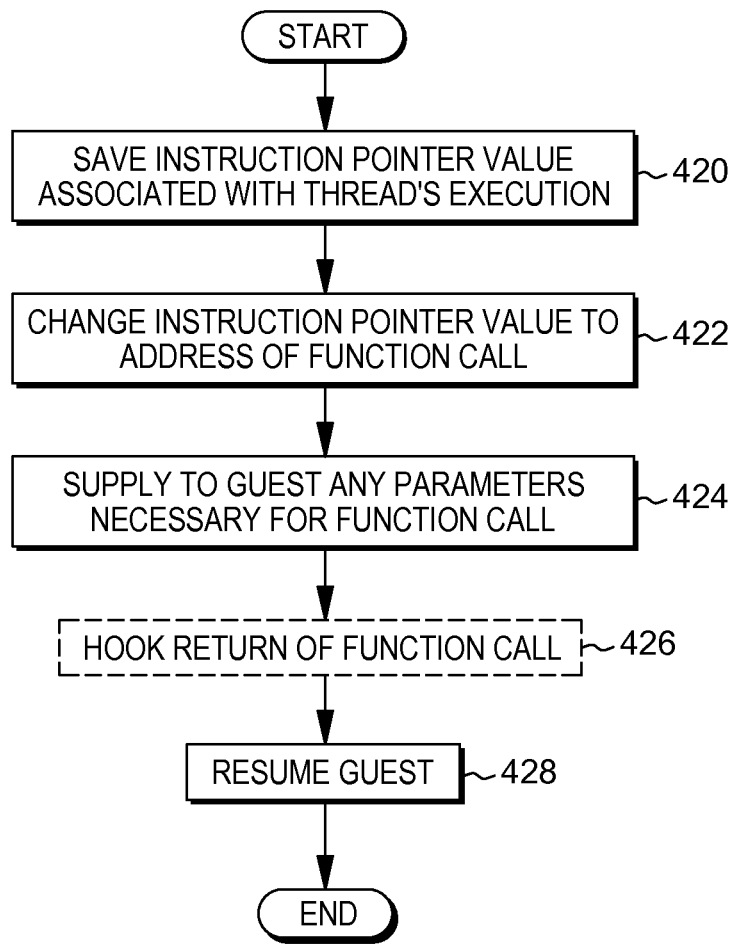
FIG. 4B depicts an example process for redirecting execution of an executing thread of a guest virtual machine, in accordance with aspects described herein.
Figure 4C:
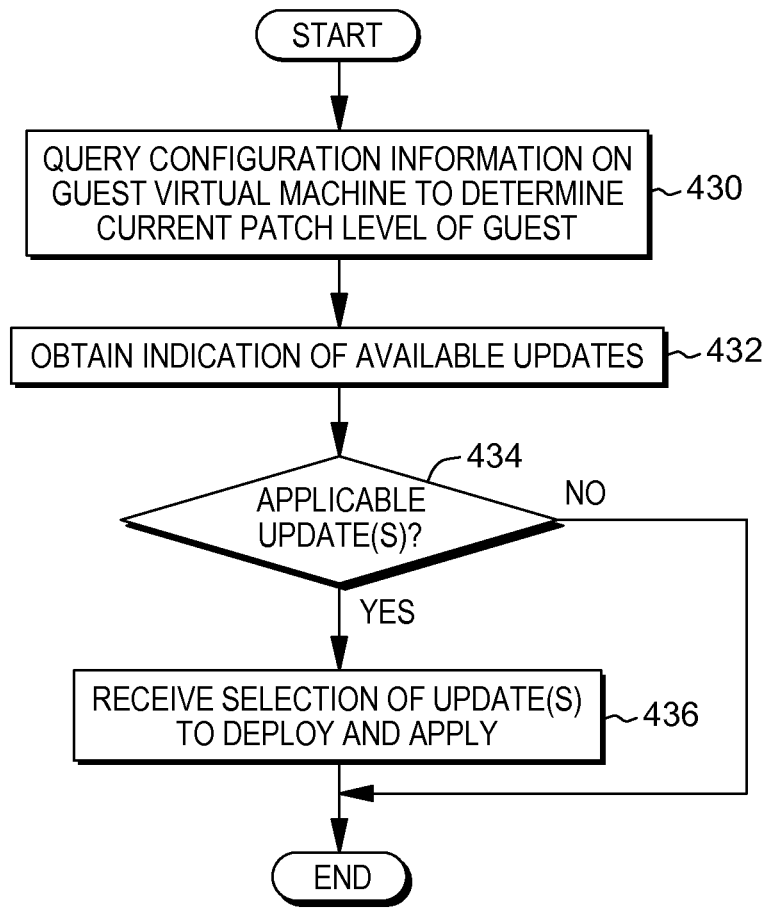
FIG. 4C depicts an example process for determining to deploy an update to a guest virtual machine, in accordance with aspects described herein.

FIGS. 4A-4C depict example processes performed by one or more computer systems for deploying and installing updates to a guest virtual machine, in accordance with aspects described herein. Specifically, FIG. 4A depicts an example process for deploying an update to a guest virtual machine, in accordance with aspects described herein. The update may be a software update, such as a security update or other type of update to be applied to operating system or other software of the guest virtual machine. The guest virtual machine may be a guest of a hypervisor, and the update may be deployed during runtime of the guest virtual machine. In some embodiments, the process of FIG. 4A is performed by the hypervisor.

The process begins by identifying an executing thread of the guest virtual machine (402). The identified thread is identified for redirection to invoke functions to accomplish deployment of the update. Identifying the thread may include selecting the thread from a plurality of executing threads of the guest virtual machine. The selection may target a thread deemed to have sufficient privileges to perform one or more desired actions, such as making desired function or system calls. By way of specific example, the selecting may include identifying a respective security identifier of each thread of the executing threads of the guest virtual machine, and then selecting the thread from the plurality of executing threads based on the security identifier of the thread indicating that the thread executes at a heightened privilege level, such as administrative privileges.

In order for the hypervisor to redirect execution of the executing thread, the hypervisor may drive a separate interception of execution of the guest virtual machine, which may be accomplished by setting a trap to occur during execution of the thread (404). In some examples, the interception is based on a fault of the guest virtual machine. Alternatively, a separate interception of execution may not be necessary, for instance when the hypervisor can interject at a time when the virtual machine is paused for some other purpose.

In any case, the process proceeds by redirecting execution of the thread to a function to open a handle to a file of the guest virtual machine (406). The file to which a handle is being opened is the target file to which data of the update is to be written. An example process for redirecting execution of a thread of a guest virtual machine is described below and depicted with reference to FIG. 4B.

As part of the redirecting execution, the hypervisor may drive another interception of execution, for instance one that occurs after the guest virtual machine executes the instruction to which execution is being redirected. As an example, the hypervisor may register a hook on the return from a system call to which execution of the thread was redirected. Thus, the hypervisor can register a hook on the return, resume the guest to execute the instruction to which execution was redirected (i.e. to accomplish the system call), and then intercept execution upon return from the system call based on hooking that return.

In the example of FIG. 4A, the hypervisor redirects execution of the guest to open a handle to a target file (406). Based on registering a hook to intercept execution after the file handle is opened, the guest is resumed and makes the system call, the return from which causes a trap to the hypervisor. The hypervisor then provides data to a component of the guest virtual machine (408). In some examples, the component is virtual memory of the guest virtual machine allocated based on driving one or more system calls by the guest to call for allocation of such buffer space. The provided data may be some or all of the update that is being deployed.

Additionally at this point execution of the thread may be redirected again (410), this time to a function to write the data, that was provided to the component, to the file. The function may be a system call to perform the write to the file. When a system call required parameters to be supplied, the hypervisor can push these to the guest. Accordingly, as part of the providing data to the component of the guest virtual machine (408) or at any other time a system call is to be invoked by the guest, the hypervisor may also provide to the guest virtual machine any parameters needed for performing the system call to which execution is being redirected, as is explained further below with reference to FIG. 4B.

In some embodiments, redirecting the execution of the thread (i.e. to the function to open the handle to the file or to the function to write the data) may be accomplished by the hypervisor modifying an instruction pointer value associated with the thread to an address of the appropriate system call. The hypervisor can then resume execution of the guest virtual machine, which executes the next instruction to initiate the system call.

Writing the data of the update may require multiple system calls to write different portions of the update, for instance when the update cannot be written in one piece. Thus, a loop in FIG. 4A may be entered in which it is first determined whether there is additional data to write (412). If so, the process returns to (408) where that data is provided to the component of the guest, and the process again redirects execution of the thread to write the data to the opened file (410). The process loops so that for each additional portion of the update to be written, the additional portion of the update is provided to the component of the guest virtual machine, and execution of the thread is redirected to a function to write the additional data, provided to the component, to the opened file. The looping may be accomplished by the hypervisor driving an interception of execution to trap to the hypervisor on the return of the system call to write the data provided to the guest. This gives the hypervisor an opportunity to perform check (412) after each portion of data is written in order to determine whether the writing of the update is complete.

Eventually there is no more data to write to the guest, at which point various actions may be performed. For instance, execution of the thread may again be redirected, this time to a function to close the handle to the file (414). The hypervisor can then initiate guest virtual machine installation of the deployed update. The initiation of the installation may use execution redirection as was used above, and may proceed to redirect execution of any desired thread of the guest virtual machine to invoke an update installation application. The same thread as was redirected initially (406, 410, 414) may be redirected to initiate installation, or a different thread—perhaps one with different security privileges— may be redirected to initiate the installation. In any case, the process of FIG. 4A proceeds by redirecting execution of a thread of the guest virtual machine to a function to invoke a new process to install the update (416). The new process is a new process executing on the guest virtual machine, and the new process executes a program of the guest virtual machine to handle the installation of the deployed update. In the examples above, the new process executes the wusa.exe program of a Windows® operating system.

Execution of one (or more) thread(s) of the guest is redirected to invoke functions for achieving the deploying and initiating installation of the update, so it is likely desired, though not necessarily required, to restore execution of the thread(s) to their respective points of execution prior to their redirection. FIG. 4A therefore proceeds by restoring execution of the thread(s) to its/their prior point of execution, and resuming the guest virtual machine (418). Restoring execution of a thread includes, for instance, restoring the instruction pointer value associated with the thread to a saved instruction pointer value, i.e. one that was saved just prior to redirecting its execution.

By utilizing execution injection as described above, the deploying of the update, i.e. writing it to guest virtual disk, may be performed while a virtual disk of the guest virtual machine is mounted by a guest operating system executing in the guest virtual machine. Furthermore, it may be performed absent introduction of external executable code to the guest virtual machine for execution by the guest virtual machine to perform checking for the update, obtaining the update, or writing the update to the file.

FIG. 4B depicts an example process for redirecting execution of an executing thread of a guest virtual machine, in accordance with aspects described herein. In some embodiments, the process is performed by the hypervisor based on an interception of execution of the guest virtual machine. The execution of the guest can be redirected to any location desired, though in the examples described herein it is redirected to one of various function calls for performing a given task.

The process of FIG. 4B begins by saving an instruction pointer value associated with the executing thread (420), if not already saved. In this regard, execution of a thread proceeds through instructions and the instruction pointer value typically points to the next instruction to execute. By saving the instruction pointer value, an initial point of execution prior to redirection is saved for later restoration.

The process then changes a value of the instruction pointer to an address of a desired function call (422). Example function calls to which execution is redirected as described herein include those to open a file handle, close a file handle, allocate virtual memory, read virtual memory, write data to a file, or launch a new process, though it is understood that execution may be redirected to an address of any desired function or to any other location possible, if desired.

For function calls that require/rely on parameters, the process proceeds to supply such parameters to the guest (424) as needed. For example, the parameters may be pushed onto a stack or provided to any appropriate component of the guest virtual machine so that they are available when the guest executes the instruction to make the call to the function.

Since the hypervisor may wish to drive an interception of guest execution following the guest's execution of the instruction to which execution is being redirected, the process of FIG. 4B can proceed to an optional step to hook a return of the function call (426). An example when this is used is when multiple redirections of execution are needed to accomplish a task, like writing multiple portions of a file to disk (see FIG. #412, 408, 410 of FIG. 4A). The process then proceeds to resume the guest (428) and ends.

The process of FIG. 4A may be initiated based on determining to deploy an update to a guest virtual machine. FIG. 4C depicts an example process to make such a determination, in accordance with aspects described herein. In some embodiments, the process of FIG. 4C is performed by a hypervisor.

The process begins by the hypervisor sending a query to the guest virtual machine for configuration information of the guest virtual machine, in order to determine a current patch level of the guest virtual machine (430) such as a patch level of an operating system or other software of the guest. Additionally, the process obtains an indication of available updates (432). Such indication may be obtained from a database component as described herein, which maintains this information. The process then compares the guest virtual machine current patch level to the indication of the available updates for the guest virtual machine, and determines based on that comparison whether there are any applicable updates for the guest virtual machine (434). If not, the process ends. Otherwise, the process receives a selection, from a user, of updates to deploy and apply to the guest virtual machine (436), the selection from the user being an indication that the update is to be applied.

Various aspects of installation and use of the facilities described herein are now provided by way of examples involving particular configurations. These examples are provided merely for convenience and understanding by way of specific example, and are not limiting on the scope or applicability of the facilities described herein.

Installation:

Three components are installed:

(i) Back-end—The back-end is the core server. It handles job tasks by leveraging IntroVirt®-associated tools to interact with guest systems;

(ii) Front-end—Web-based graphical user interface for the back-end; and (iii) Database—MySQL database used to store information required by the back-end and front-end components.

The back-end and front-end components depend in this example on Python 2.7. Ensure that the target system has this version of Python installed. Each component will be installed and run on an IntroVirt®-capable Ubuntu® 14.04 machine (Ubuntu is a registered trademark of Canonical Ltd., London, United Kingdom).

CD Contents:

The components can be installed from an installation CD. The following is a list of folders on the installation CD, which will be referenced below:

/documentation—Contains user and installation manuals
/frontend—Contains the front-end software
/backend—Contains the back-end software
/database—Contains the database schema
/tools—Contains support tools
/introvirt—Contains IntroVirt® installation packages
/install.sh—Automatic installation script Install Ubuntu®:

Install Ubuntu® version 14.04 (x64 desktop edition) onto a machine on which the facilities will be configured. See http://www.ubuntu.com for instructions on downloading and installing this operating system.

Automatic Installation:

The provided CD contains an installation script that will install IntroVirt®, components of the facilities described herein, and their dependencies on a fresh Ubuntu® 14 machine. Open a terminal and navigate to the CD directory: $ cd <CD_PATH>. Run the installation script: $ sudo ./install.sh. The installation script will prompt for user input when installing dependencies and configuring MySQL. Make sure to install all the dependencies and take note of the MySQL root password. The installation script will ask for the MySQL root password when importing the database and creating the MySQL user. Once the installation is completed, the script will output important information about the installation. Restart the system after reading the script's output.

Manual Installation:

IntroVirt® Installation: Facilities described herein run in conjunction with IntroVirt®, an introspective Xen®-based hypervisor. IntroVirt® is installed by following the steps below:

(i) Open a terminal and navigate to the /introvirt directory on the installation CD: $ cd <CD_PATH>/introvirt.

(ii) Install the necessary dependencies and tools using the following command: $ sudo apt-get install libboost-filesystem1.54.0 libjsoncpp0 libboost1.54-dev bridge-utils qemu virt-manager python2.7 liblog4cxx10 liblog4cxx10-dev ocaml-base-nox.

(iii) In this directory, run the following command to install the necessary IntroVirt® packages: $ sudo dpkg -i *.deb.

(iv) Install the remaining dependencies using the following command: $ sudo apt-get -f install.

(v) Reboot the machine to complete the installation.

Database Installation:

A MySQL database is used to pass information between the back-end and front-end components. The database must be remotely accessible to both the back-end and front-end components, unless the database is installed in the same system as the other two components (in that case the database must be accessible to the local network).

(i) Install MySQL server: $ sudo apt-get install mysql-server. During the setup, you will be prompted for the "root" user's password. This password will be used later in the installation.

(ii) The database schema is located in the /database directory on the provided CD. Import the schema into MySQL by using the following command: $ mysql -u root -p -h localhost<CD_PATH/database/shihtsu.sql. If you are using a database on a separate system, replace "localhost" with the address or hostname of the system containing the database. The root password will need to be provided when prompted.

(iii) Log into the MySQL server with the following command: $ mysql -u root -p -h localhost. Again note if you are using a database on a separate system, replace "localhost" with the address or hostname of the system containing the database. The root password will need to be provided when prompted.

(iv) Execute the following SQL in the mysql prompt to add a user for the database: CREATE USER 'shihtsu'@'ADDRESS/HOSTNAME' IDENTIFIED BY 'PASSWORD'; GRANT ALL ON shihtsu.* TO 'shihtsu'@'ADDRESS/HOSTNAME'. Replace ADDRESS/HOSTNAME with the proper hostname or IP address of the system where the database is hosted (localhost in this example) and replace PASSWORD with the desired password for the new user.

Back-end Installation:

The back-end component is installed in an IntroVirt® capable system. If the database is located on a different system than the back-end, ensure the back-end server can access the remote database. This manual assumes that the back-end is to be installed on an Ubuntu® 14.04 system.

(i) Ensure IntroVirt® is installed and properly configured on the system that will host the back-end. Instructions to install IntroVirt® are available above.

(ii) Create a directory to store the back-end files. This manual will use /opt/shihtsu-backend. $ sudo mkdir /opt/shihtsu-backend.

(iii) Copy the contents of the /backend directory to the new directory (In this case /opt/shihtsu-backend): $ sudo cp -R CD_PATH/backend/* /opt/shihtsu-backend.

(iv) Install PIP (a Python package installer) if it is not already installed: $ sudo apt-get install python-pip.

(v) Install the pymysql dependency from PIP: $ sudo pip install pymysql.

If PIP does not install the pymysql package for Python 2.7 by default, use "pip2" instead of "pip".

Front-end Installation:

The front-end component, comprising a web application, may be installed on a remote system capable of accessing the database or in the same system as any of the other components. The following covers installation on the same system as the back-end and database.

(i) Create a directory to store the front-end files—use /opt/shihtsu-frontend for the purposes of this: $ sudo mkdir /opt/shihtsu-frontend.

(ii) Copy the contents of the /frontend directory in the provided CD to the directory created in the previous step: $ sudo cp -R CD_PATH/frontend/* /opt/shihtsu-frontend.

(iii) Install the pymysql (if not already installed) and flask dependencies using PIP: $ sudo pip install pymysql flask.

If PIP does not install the pymysql package for Python 2.7 by default, use "pip2" instead of "pip".

User Manual:
Configuration:
VM Configuration:

Facilities described herein interface with guest virtual machines at the hypervisor level in order to properly complete low-level tasks such as pushing files into the guest's disk, parsing registry data, etc. Guest virtual machines can be configured as specified in this section in order to meet operational requirements for the back-end.

Update Repository Configuration:

Microsoft® Security Updates in MSU binary files are example updates to deploy and install to guest virtual machines. These files are accessible by mounting monthly security update images (ISOs) or copying the image contents into the directory where the back-end component expects to find the updates, as examples. The provided CD may contain the update files arranged by monthly security updates releases. Optionally, update ISOs can be downloaded and mounted into the updates directory.

Security Bulletins Meta-Data

Security Bulletin information may be used for security update management purposes. Microsoft®, for instance, updates a file with the meta-data of all security bulletins every month. The database can be populated with information contained within this file. In some embodiments, only security updates that are accounted-for within imported security bulletin meta-data will be available for deployment using the update facilities provided herein. The database may come pre-loaded with meta-data of updates released before a given period of time. Instructions on how to import the security bulletin meta-data to the database are as follows:

(i) Download the security bulletin meta-data from the operating system manufacturer (e.g. http://www.microsoft.com/en-us/download/details.aspx?id=36982). It may be formatted as a spreadsheet (e.g. ".xlsx") as an example.

(ii) Convert the downloaded file to CSV format:

Microsoft® Office: File>Save As (If you are given a prompt about not saving in Protected View, select "Enable Saving"). In the save prompt, open the dropdown next to "Save as Type" and select CSV (comma separated value). Select "Save", then at the feature compatibility prompt select "Yes."

LibreOffice (offered by The Document Foundation, Berlin, Germany): File>Save As. In the save prompt, change the dropdown that says "All Formats" to "Text CSV." At the "Confirm File Format" prompt, select "Use Text CSV Format." At the "Export Text File" prompt, make sure the field delimiter is set to a comma (,) and the character set is Unicode (UTF-8). Then select "OK."

(iii) Extract the security bulletin meta-data population tool by copying the tools directory from the provided disk to the back-end server system. For the purpose of this manual, the directory will be copied to /tmp. $ sudo cp -R CD_PATH/tools /tmp/.

(iv) Configure the tool by editing the "config.json" file located in the root directory (/tmp/tools). Set the values for username, password, database, host, and port accordingly. For example:

```
{
    "Username": "shihtsu",
    "Password": "password",
    "Host": "localhost",
    "Database": "shihtsu",
    "Port": 3306
}
```

(v) Run the tool: $sudo python /tmp/tools/microsoft-security-bulletin-csv-parser /msb-csv-parser.py -c /path/to/config.json /path/to/csv/file.

Update Repository Location:

The update files in the disk images should be accessible on the file-system where the back-end is located. To do this, the disk images are mounted in an update repository organized by year and month. For purposes herein, the update repository will be included in the back-end's directory: /opt/shihtsu-backend/updates.

Add New Updates to the Update Repository:

Updates should be added into the repository using the same directory structure that is used in the security update ISOs. It is recommended to mount the security update ISOs directly into the update repository. To mount the example disk image, the directories are first created. This can be done with the following command: $ sudo mkdir -p /opt/shihtsu-backend/updates/YEAR/MONTH.

For example: $ sudo mkdir -p /opt/shihtsu-backend/updates/2015/February.

Then mount the ISO to the newly made location: $ sudo mount -o loop /path/to/ISO /opt/shihtsu-backend/updates/YEAR/MONTH.

For example: $ sudo mount -o loop /path/to/Feb2015UpdateISO /opt/shihtsu-backend/updates/2015/February.

Adding Approved KB Entries to the Database

An auto-update-approve tool may be used to approve every update that is accessible to the back-end. Instructions on how to use the tool follow:

(i) Copy the contents of the tools directory to a location to back-end server. For example: $ sudo cp -R CD_PATH/tools /tmp/.

(ii) Configure the tool by editing the "config.json" file located in the root directory (/tmp/tools). Set the values for username, password, database, host, and port accordingly. For example:

```
{
    "Username": "shihtsu",
    "Password": "password",
    "Host": "localhost",
    "Database": "shihtsu",
    "Port": 3306
}
```

(iii) Run the tool: $ sudo python /tmp/tools/auto-update-approve/auto-update-approve.py /opt/shihtsu-backend/updates.

All available updates will be approved and accessible for live patching jobs.

Back-end Configuration:

The back-end component is configured with database information in order to function correctly. Configuration parameters are stored in the "config.json" file located in the base directory of the server install (which is /opt/shihtsu-backend for this example). The configuration file includes the following database information: username, password, host address, port, and database name. For example:

```
{
    "Username": "shihtsu",
    "Password": "password",
    "Host": "localhost",
    "Database": "shihtsu",
    "Port": 3306
}
```

Front-end Configuration:

The front-end component is configured with database information in order to function correctly. Configuration parameters are stored in the "config.json" file located in the base directory of the server install (which is /opt/shihtsu-frontend for this example). The configuration file may be identical to the configuration file of the back-end. See above for more details.

Starting the components:

Running Back-end Server:

On a terminal on the device containing the back-end server, start the server with the following command (change the path if the CD's /backend contents were placed elsewhere): $ sudo python2.7 /opt/shihtsu-backend/server.py -c /opt/shihtsu-backend/config.json.

Running Front-end Web Server:

On a separate terminal on the device containing the front-end server, start the web server with the following command (change the path if the CD's /frontend contents were placed elsewhere.) $ sudo python /opt/shihtsu-frontend/server.py -c /opt/shihtsu-frontend/config.json.

After running the server.py script, a message should be printed saying that the server is started and running on port 5000.

Accessing the Interface:

Once the front-end is running, the web interface may be accessed by navigating to the following URL: http://FRONTEND_IP_ADDRESS:5000, where "FRONTEND_IP_ADDRESS" is the IP address of the system hosting the front-end.

Navigation:

In example interfaces, the main navigation panel is located in the left side of the page. This panel contains links to the main interfaces: "Dashboard", "Manage Assets", "Schedule Jobs", "Statistics", "History", and "Settings" as examples.

Notifications:

Notifications may be displayed in the upper right corner of every page of the interface. When notifications are available, the number in the right section of the button will display how many notifications are available and the user may click the notifications button to display messages. Old notifications may or may not be removed automatically.

Dashboard:

The Dashboard may be the first panel presented in the web interface and may give an overview of the overall system state. It can include the following four sections, as examples:

The top left section (Server Status) shows the status of the back-end server and the update server. A red power symbol indicates the server is offline. A green power symbol indicates the server is online.

The top right section (Systems Up-To-Date) shows the percentage of enabled systems that are up-to-date (all approved updates installed).

The middle section (Updates Pending Approval) shows the number of overall updates that can be installed to systems.

The bottom section (Job Listing) shows the job history and the current progress of jobs.

Manage Assets:

The Manage Assets interface can include the following six sections, as examples: Machines, Machine Groups, Jobs, Patch Policies, Updates, and Servers. The Manage Assets interface allows an operator to manage different assets by: inspecting current assets, modifying assets, adding new assets, or removing assets.

The Machines section allows an operator to inspect machines that are currently part of the system. The user can select a machine from the Machines panel on the left side of the page by expanding the tree titled "Default". "Default" refers to the default machine group where all the machines that join the system are placed (for organizational purposes as well as batching jobs). New machine groups may be created and machines may be added to or removed from machine group(s). Clicking a machine in the Machines panel can load information regarding the selected machine into the "General Information" and "System Status" panels.

Schedule Jobs:

The "Schedule Jobs" panel allows the user to schedule jobs for system patching. In order to schedule a new job, follow the following instructions:

(i) Select one or more devices from the machine group tree dropdowns in the "Machines" panel at the left of side of the page. "+" will expand trees, while "−" will collapse them.

(ii) In the "General Configuration" section, set a name for the job and the date and time at which it will be started.

(iii) In the "Applicable Updates" section, choose the desired updates to apply to the selected machines. Only updates applicable to machines will be applied. For example, if an x86 machine and an x64 machine are selected, only x64 updates that the x64 machine does not have installed yet will be applied and only x86 updates that the x86 machine does not have installed yet will be applied.

(iv) Click "Schedule Job" to create the job, which will run at the determined date and time.

Use Case:

The following is a step-by-step example of installing an update:

(i) Ensure components are installed (per guide above).

(ii) Ensure the back-end server has not been started. If a console is open with the server running in it, press Ctrl-C to stop it. Having the back-end open during the following steps may register a virtual machine multiple times as it stops and starts.

(iii) Set up and install a single virtual machine.

(iv) Once the virtual machine is running, log into the Windows® operating system with any user.

(v) Start the back-end. The prompt should indicate that the server is active.

(vi) Start the front-end server. The prompt should indicate that the server is active.

(vii) Navigate to the front-end's web interface with a web browser (such as Chrome™ browser; Chrome is a trademark of Google Inc., Mountain View, Calif., U.S.A.): http://FRONTEND_IP_ADDRESS:5000. Replace "FRONTEND_IP_ADDRESS" with the IP address of the machine that is hosting the front-end server.

(viii) In the left navigation panel, click the "Schedule Jobs" hyperlink. This will bring up the job scheduling interface.

(ix) In the "Machines" panel, select the virtual machine to install updates to. Use the "+" to expand the tree of devices. Click the checkbox next to the machine to select it.

(x) Once a machine is selected, the "Applicable Updates" section will present a list of updates that can be installed to the machine. Select KB3004361 (from the February 2015 updates) by checking the box next to its name. The Job Schedule interface may look similar to FIG. 3 herein.

(xi) In the "General Configuration" panel, enter a name in "Job Name" text field and choose the time for the job to start. By default, the job will run as soon as possible.

(xii) Click the "Schedule Job" button. A notification in the top section of the web page will indicate that starting the job was successful.

(xiii) To view the job's progress, click the "Dashboard" hyperlink on the left navigation panel.

(xiv) On the "Dashboard" interface, scroll down to the "Job Listing" section. The job and its progress will be visible. Note that in order to view the job progress update, the page may need to be refreshed.

An example schema for a database in accordance with aspects described herein is presented at the conclusion of this specification.

Those having ordinary skill in the art will recognize that aspects of the present invention may be embodied in one or more systems, one or more methods and/or one or more computer program products. In some embodiments, aspects of the present invention may be embodied entirely in hardware, entirely in software (for instance in firmware, resident software, micro-code, etc.), or in a combination of software and hardware aspects that may all generally be referred to herein as a "system" and include circuit(s) and/or module(s).

Figure 5:
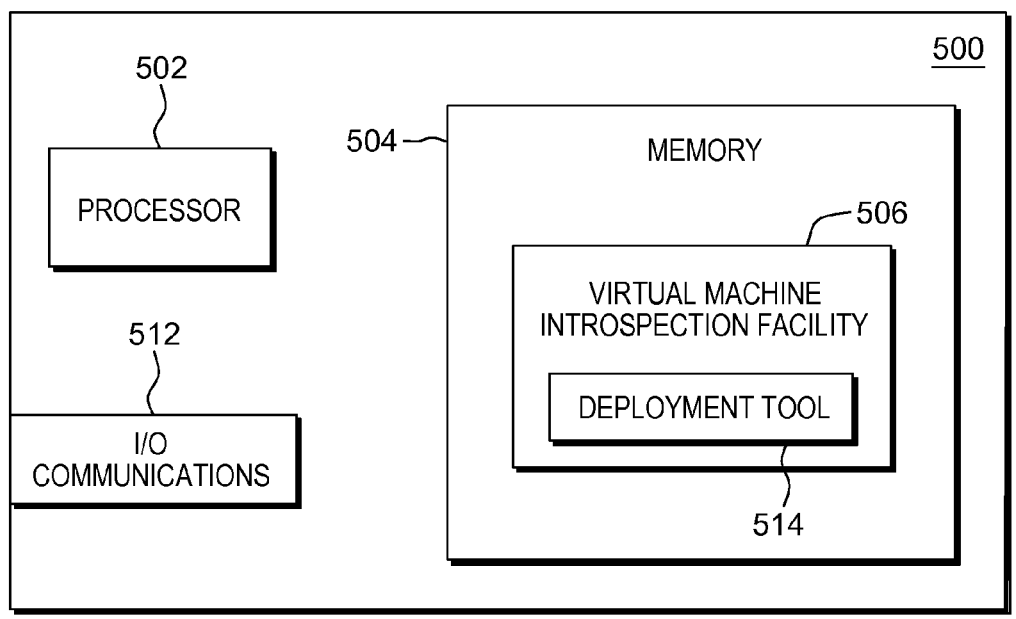
FIG. 5 depicts an example embodiment of a computer system incorporating aspects described herein.

FIG. 5 depicts one example embodiment of a computer system incorporating aspects described herein. Computer system 500 includes a processor 502 and memory 504. Processor 502 includes any appropriate hardware component(s) capable of executing one or more instructions from memory 504. Memory 504 includes a virtual machine introspection facility 506 of which deployment tool(s) 514 are a part that execute to perform/provide facilities described herein. Additionally, memory 504 can include a hypervisor and guest machines and/or virtual environments and facilities thereof (not pictured) for execution.

Further, computer system 500 includes an input/output (I/O) communications interface component 512 for communicating data between computer system 500 and external devices, such as I/O and peripheral devices (mouse, keyboard, display devices) and network devices.

In some embodiments, aspects described herein may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 6:
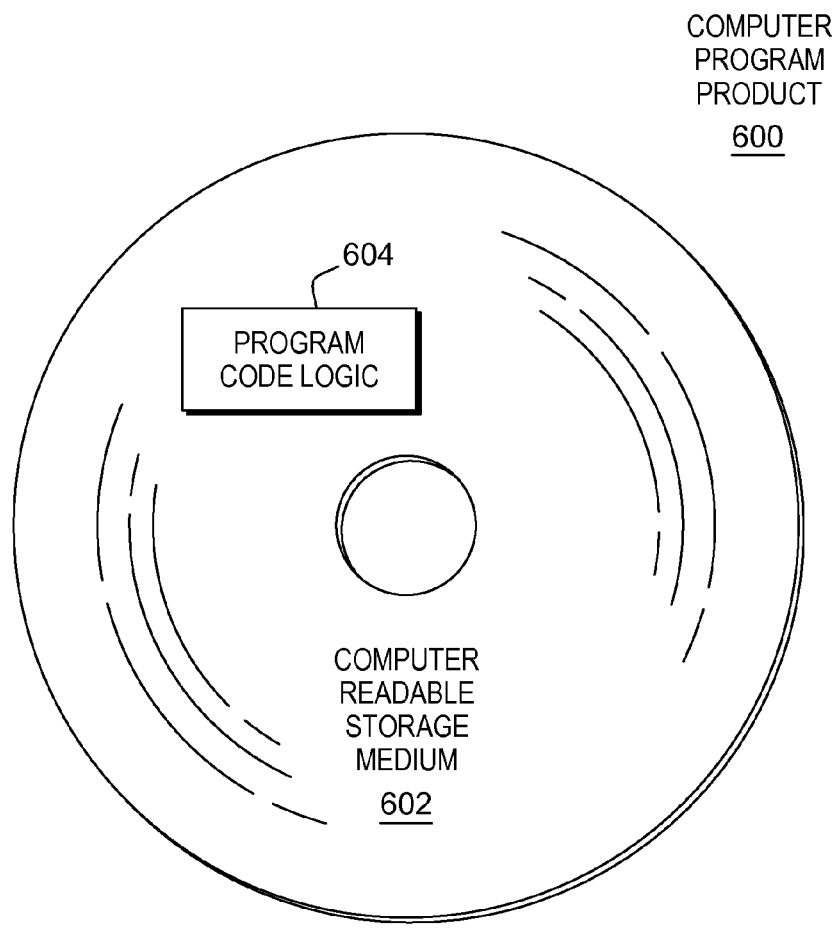
FIG. 6 depicts an embodiment of a computer program product incorporating aspects described herein.

Referring now to FIG. 6, in one example, a computer program product 600 includes, for instance, one or more computer readable media 602 to store computer readable program code means or logic 604 thereon to provide and facilitate one or more aspects described herein.

Program code contained or stored in/on a computer readable medium can be obtained and executed by a computer system (computer, computer system, etc. including a component thereof) and/or other devices to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more computer system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

```
-- phpMyAdmin SQL Dump
-- version 4.0.10deb1
-- http://www.phpmyadmin.net
-- Host: localhost
-- Generation Time: Mar. 09, 2015 at 03:33 PM
-- Server version: 5.5.40-0ubuntu0.14.04.1
-- PHP Version: 5.5.9-1ubuntu4.5
SET SQL_MODE ="NO_AUTO_VALUE_ON_ZERO";
SET time_zone = "+00:00";
/*!40101 SET @OLD_CHARACTER_SET_CLIENT=@@CHARACTER_SET_CLIENT */;
/*!40101 SET @OLD_CHARACTER_SET_RESULTS=@@CHARACTER_SET_RESULTS */;
/*!40101 SET @OLD_COLLATION_CONNECTION=@@COLLATION_CONNECTION */;
/*!40101 SET NAMES utf8 */;
-- Database: 'shihtsu'
CREATE DATABASE IF NOT EXISTS 'shihtsu' DEFAULT CHARACTER SET utf8
COLLATE utf8_unicode_ci;
USE 'shihtsu';
-- Table structure for table 'internal_services'
DROP TABLE IF EXISTS 'internal_services';
CREATE TABLE IF NOT EXISTS 'internal_services' ('id' int(11) NOT NULL
AUTO_INCREMENT, 'name' varchar(50) COLLATE utf8_unicode_ci NOT NULL, 'online'
tinyint(1) NOT NULL DEFAULT '1', 'last_update' date time NOT NULL, PRIMARY KEY
('id'), UNIQUE KEY 'name' ('name')
) ENGINE=InnoDB DEFAULT CHARSET=utf8 COLLATE=utf8_unicode_ci
AUTO_INCREMENT=3 ;
-- Truncate table before insert 'internal_services'
TRUNCATE TABLE 'internal_services';
--Dumping data for table 'internal_services'
INSERT INTO 'internal_services' ('id', 'name', 'online', 'last_update') VALUES
(1,'SHIH-TSU Server', 0, '2015-03-09 15:24:02'),
(2, 'Windows Update Server', 0, '2015-01-23 10:49:52');
-- Table structure for table 'jobs'
DROP TABLE IF EXISTS 'jobs';
CREATE TABLE IF NOT EXISTS 'jobs' ('id' int(11) NOT NULL AUTO_INCREMENT,
'name' varchar(50) COLLATE utf8_unicode_ci NOT NULL, 'progress' int(11) NOT NULL
DEFAULT '0', 'start_datetime' datetime NOT NULL, 'state'
enum('Idle','Queued','Working','Paused','Finished') COLLATE utf8_unicode_ci NOT NULL
DEFAULT 'Idle', PRIMARY KEY ('id')) ENGINE=InnoDB DEFAULT CHARSET=utf8
COLLATE=utf8_unicode_ci AUTO_INCREMENT=1 ;
-- Truncate table before insert 'jobs'
TRUNCATE TABLE 'jobs';
```

```sql
-- Table structure for table 'job_notifications';
DROP TABLE IF EXISTS 'job_notifications';
CREATE TABLE IF NOT EXISTS 'job_notifications' ( 'id' int(11) NOT NULL
AUTO_INCREMENT, 'job_id' int(1) NOT NULL, 'task_id' int(11) NOT NULL, 'type'
enum('Info','Warning','Error','Debug') COLLATE utf8_unicode_ci NOT NULL, 'message' text
COLLATE utf8_unicode_ci NOT NULL, 'extra_data' text COLLATE utf8_unicode_ci NOT
NULL, 'created_datetime' datetime NOT NULL, 'seen' tinyint(1) NOT NULL,
'seen_datetime' datetime NOT NULL, PRIMARY KEY ('id'), KEY 'job_id' ('job_id'), KEY
'task_id' ('task_id'), KEY 'job_id_2' ('job_id')
) ENGINE=InnoDB DEFAULT CHARSET=utf8 COLLATE=utf8_unicode_ci
AUTO_INCREMENT=1;
-- Truncate table before insert 'job_notifications'
TRUNCATE TABLE 'job_notifications';
-- Table structure for table 'job_tasks';
DROP TABLE IF EXISTS 'job_tasks';
CREATE TABLE IF NOT EXISTS 'job_tasks' ( 'id' int(11) NOT NULL
AUTO_INCREMENT, 'job_id' int(11) NOT NULL, 'machine_id' int(11) NOT NULL, 'type'
enum('Survey','Push','Execute','Clean') COLLATE utf8_unicode_ci NOT NULL, 'input_data'
text COLLATE utf8_unicode_ci NOT NULL, 'result_data' text COLLATE utf8_unicode_ci
NOT NULL, 'started' tinyint(1) NOT NULL DEFAULT '0', 'finished' tinyint(1) NOT NULL
DEFAULT '0', 'start_datetime' datetime NOT NULL, 'finish_datetime' datetime NOT NULL,
PRIMARY KEY ('id'), KEY 'job id' ('job_id'), KEY 'machine_id' ('machine_id')
) ENGINE=InnoDB DEFAULT CHARSET=utf8 COLLATE=utf8_unicode_ci
AUTO_INCREMENT=1;
-- Truncate table before insert 'job_tasks'
TRUNCATE TABLE 'job_tasks';
-- Table structure for table 'machines'
DROP TABLE IF EXISTS 'machines';
CREATE TABLE IF NOT EXISTS 'machines' ( 'id' int(11) NOT NULL
AUTO_INCREMENT, 'uuid' varchar(36) COLLATE utf8_unicode_ci NOT NULL, 'name'
varchar(50) COLLATE utf8_unicode_ci NOT NULL, 'ip' varchar(11) COLLATE
utf8_unicode_ci NOT NULL DEFAULT '0.0.0.0', 'server_id' int(11) NOT NULL, 'os'
enum('Windows7','Windows8.1','WindowsServer2012','WindowsServer2012R2','WindowsVista'
,'WindowsServer2003','Windows8','WindowsServer2003R2','WindowsServer2008','WindowsSer
ver2008R2','WindowsXP','Unknown') COLLATE utf8_unicode_ci NOT NULL, 'arch'
enum('X86','X64','IA64','ARM','Unknown') COLLATE utf8_unicode_ci NOT NULL, 'online'
tinyint(1) NOT NULL DEFAULT '1', 'shihtsu_enabled' tinyint(1) NOT NULL DEFAULT '1',
'service_pack' int(11) NOT NULL, 'up_to_date' tinyint(1) NOT NULL DEFAULT '0',
PRIMARY KEY ('id'), UNIQUE KEY 'uuid' ('uuid'), KEY 'server_id' ('server_id')
) ENGINE=InnoDB DEFAULT CHARSET=utf8 COLLATE=utf8_unicode_ci
AUTO_INCREMENT=1;
-- Truncate table before insert 'machines'
TRUNCATE TABLE 'machines';
-- Table structure for table 'machine_groups'
DROP TABLE IF EXISTS 'machine_groups';
CREATE TABLE IF NOT EXISTS 'machine_groups' ( 'id' int(11) NOT NULL
AUTO_INCREMENT, 'name' varchar(50) COLLATE utf8_unicode_ci NOT NULL,
PRIMARY KEY ('id')
) ENGINE=InnoDB DEFAULT CHARSET=utf8 COLLATE=utf8_unicode_ci
AUTO_INCREMENT=2;
-- Truncate table before insert 'machine_groups'
TRUNCATE TABLE 'machine_groups';
-- Dumping data for table 'machine_groups'
INSERT INTO 'machine_groups' ('id', 'name') VALUES
(1, 'Default');
-- Table structure for table 'machine_group_members'
DROP TABLE IF EXISTS 'machine_group_members';
CREATE TABLE IF NOT EXISTS 'machine_group_members' ( 'machine_id' int(11) NOT
NULL, 'machine_group_id' int(11) NOT NULL, UNIQUE KEY 'UNIQUE'
('machine_id','machine_group_id'), KEY 'machine_id' ('machine_id'), KEY
'machine_group_id' ('machine_group_id')
) ENGINE=InnoDB DEFAULT CHARSET=utfg COLLATE=utf8_unicode_ci;
-- Truncate table before insert 'machine_group_members'
TRUNCATE TABLE 'machine_group_members';
-- Table structure for table 'machine_servers'
DROP TABLE IF EXISTS 'machine_servers';
CREATE TABLE IF NOT EXISTS 'machine_servers' ( 'id' int(11) NOT NULL
AUTO_INCREMENT, 'uuid' varchar(36) COLLATE utf8_unicode_ci NOT NULL, 'name'
varchar(50) COLLATE utf8_unicode_ci NOT NULL, 'ip' varchar(11) COLLATE
utf8_unicode_ci NOT NULL DEFAULT '0.0.0.0', 'online' tinyint(1) NOT NULL DEFAULT
'1', PRIMARY KEY ('id'), UNIQUE KEY 'uuid' ('uuid')
) ENGINE=InnoDB DEFAULT CHARSET=utf8 COLLATE=utf8_unicode_ci
AUTO_INCREMENT=2;
-- Truncate table before insert 'machine_servers'
TRUNCATE TABLE 'machine_servers'
-- Dumping data for table 'machine_servers'
INSERT INTO 'machine servers' ('id', 'uuid', 'name', 'ip', 'online') VALUES
(1, '00000000-0000-0000-0000-000000000000', 'No Server', '0.0.0.0', 1);'
-- Table structure for table 'machine_updates_cache'
```

```
DROP TABLE IF EXISTS 'machine_updates_cache';
CREATE TABLE IF NOT EXISTS 'machine_updates_cache' ( 'machine_id' int(11) NOT
NULL, 'kb_id' int(11) NOT NULL, PRIMARY KEY ('machine_id','kb_id'), KEY 'kb_id'
('kb_id')
) ENGINE=InnoDB DEFAULT CHARSET=utf8 COLLATE=utf8_unicode_ci;
-- Truncate table before insert 'machine_updates_cache'
TRUNCATE TABLE 'machine_updates_cache';
-- Table structure for table 'windows_approved_kbs'
DROP TABLE IF EXISTS 'windows_approved_kbs';
CREATE TABLE IF NOT EXISTS 'windows_approved_kbs' ( 'id' int(11) NOT NULL
AUTO_INCREMENT, 'kb_id' int(11) NOT NULL, 'os'
enum('Windows7','Windows8.1','WindowsServer2008R2','WindowsServer2012','WindowsServe
r2012R2','WindowsVista','WindowsServer2003','Windows8','WindowsServer2003R2','Windows
Server2008','WindowsServer2008R2','WindowsXP','Unknown') COLLATE utf8_unicode_ci
NOT NULL, 'arch' enum(X86','X64','IA641','ARM','Unknown') COLLATE utf8_unicode_ci
NOT NULL, 'path' text COLLATE utf8_unicode_ci NOT NULL, PRIMARY KEY ('id'),
KEY 'kb_id' ('kb_id')
) ENGINE=InnoDB DEFAULT CHARSET=utf8 COLLATE=utf8_unicode_ci
AUTO_INCREMENT=1;
-- Truncate table before insert 'windows_approved_kbs'
TRUNCATE TABLE 'windows_approved_kbs';
-- Table structure for table 'windows_bulletins'
DROP TABLE IF EXISTS 'windows_bulletins';
CREATE TABLE IF NOT EXISTS 'windows_bulletins' ( 'id' int(11) NOT NULL
AUTO_INCREMENT, 'year' int(11) NOT NULL, 'month' int(11) NOT NULL, 'number'
int(11) NOT NULL, 'title' text COLLATE utf8_unicode_ci NOT NULL, PRIMARY KEY
('id'), UNIQUE KEY 'unique_constraint' ('year','number')
) ENGINE=InnoDB DEFAULT CHARSET=utf8 COLLATE=utf8_unicode_ci
AUTO_INCREMENT=17510;
-- Truncate table before insert 'windows_bulletins'
TRUNCATE TABLE 'windows_bulletins';
-- Table structure for table 'windows_kbs'
DROP TABLE IF EXISTS 'windows_kbs';
CREATE TABLE IF NOT EXISTS 'windows_kbs' ( 'id' int(11) NOT NULL, 'bulletin_id'
int(11) NOT NULL, 'severity' enum('Low','Moderate','Important','Critical') COLLATE
utf8_unicode_ci NOT NULL, 'reboot' enum('Yes','No','Maybe') COLLATE utf8_unicode_ci
NOT NULL, PRIMARY KEY ('id'), KEY 'bulletin' ('bulletin_id')
) ENGINE=InnoDB DEFAULT CHARSET=utf8 COLLATE=utf8_unicode_ci;
-- Truncate table before insert 'windows_kbs'
TRUNCATE TABLE 'windows_kbs';
-- Constraints for dumped tables
-- Constraints for table 'job notifications'
ALTER TABLE 'job_notifications'
ADD CONSTRAINT 'job_notifications_ibfk_2' FOREIGN KEY ('task_id') REFERENCES
'job_tasks' ('id') ON DELETE CASCADE ON UPDATE CASCADE,
ADD CONSTRAINT 'job_notifications_ibfk_1' FOREIGN KEY (job_id') REFERENCES
'jobs' ('id') ON DELETE CASCADE ON UPDATE CASCADE;
-- Constraints for table 'job_tasks'
ALTER TABLE 'job_tasks'
ADD CONSTRAINT 'job_tasks_ibfk_1' FOREIGN KEY ('job_id') REFERENCES 'jobs'
('id') ON DELETE CASCADE ON UPDATE CASCADE,
ADD CONSTRAINT 'job_tasks_ibfk_2' FOREIGN KEY ('machine_id') REFERENCES
'machines' ('id') ON DELETE CASCADE ON UPDATE CASCADE;
-- Constraints for table 'machines'
ALTER TABLE 'machines'
ADD CONSTRAINT 'machines_ibfk_1' FOREIGN KEY ('server_id') REFERENCES
'machine_servers' ('id') ON DELETE CASCADE ON UPDATE CASCADE;
-- Constraints for table 'machine_group_members'
ALTER TABLE 'machine_group members'
ADD CONSTRAINT 'machine_group_members_ibfk_1' FOREIGN KEY ('machine_id')
REFERENCES 'machines' ('id') ON DELETE CASCADE ON UPDATE CASCADE,
ADD CONSTRAINT 'machine_group_members_ibfk_2' FOREIGN KEY
('machine_group_id') REFERENCES 'machine_groups' ('id') ON DELETE CASCADE ON
UPDATE CASCADE;
-- Constraints for table 'machine_updates_cache'
ALTER TABLE 'machine_updates_cache'
ADD CONSTRAINT 'machine_updates_cache_ibfk_1' FOREIGN KEY ('machine_id')
REFERENCES 'machines' ('id') ON DELETE CASCADE ON UPDATE CASCADE,
ADD CONSTRAINT 'machine_updates_cache_ibfk_2' FOREIGN KEY ('kb_id')
REFERENCES 'windows_kbs' ('id') ON DELETE CASCADE ON UPDATE CASCADE;
-- Constraints for table 'windows_approved_kbs'
ALTER TABLE 'windows_approved_kbs'
ADD CONSTRAINT 'windows_approved_kbs_ibfk_1' FOREIGN KEY ('kb_id')
REFERENCES 'windows_kbs' ('id') ON DELETE CASCADE ON UPDATE CASCADE;
-- Constraints for table 'windows_kbs'
ALTER TABLE 'windows_kbs'
ADD CONSTRAINT 'windows_kbs_ibfk_1" FOREIGN KEY ('bulletin_id') REFERENCES
'windows_bulletins' ('id') ON DELETE CASCADE ON UPDATE CASCADE;
/*!40101 SET CHARACTER_SET_CLIENT=@OLD_CHARACTER_SET_CLIENT */;
```

```
/*!40101 SET CHARACTER_SET_RESULTS=@OLD_CHARACTER_SET_RESULTS */;
/*!40101 SET COLLATION_CONNECTION=@OLD_COLLATION_CONNECTION */;
```

What is claimed is:

1. A method comprising:

deploying an update to a guest virtual machine of a hypervisor during runtime of the guest virtual machine, the deploying comprising:

identifying an executing thread of the guest virtual machine, wherein the identifying comprises selecting the thread from a plurality of executing threads of the guest virtual machine, the selecting comprising identifying a respective security identifier of each thread of the plurality of executing threads of the guest virtual machine, and selecting the thread from the plurality of executing threads based on the security identifier of the thread indicating that the thread executes at a heightened privilege level;

initially intercepting execution of the guest virtual machine at a first point of execution;

redirecting execution of the thread to a first function to open a handle to a file, of the guest virtual machine, to which data of the update is to be written;

based on the redirecting the execution of the thread to the first function to open the handle to the file, resuming execution of the guest virtual machine to open the handle to the file, wherein based on the resuming execution of the guest virtual machine to open the handle to the file, the guest invokes execution of the first function to open the handle to the file;

providing, by a component executing outside of the guest virtual machine, the data to a buffer component of the guest virtual machine;

intercepting execution of the guest virtual machine at a second point of execution;

redirecting, by the component executing outside of the guest virtual machine, execution of the thread to a second function to write the data, provided to the buffer component, from the buffer component to the file; and based on the redirecting the execution of the thread to the second function to write the data from the buffer component to the file, resuming execution of the guest virtual machine to write the data, wherein based on resuming execution of the guest virtual machine to write the data, the guest invokes execution of the second function to write the data from the buffer component to the file, and wherein the resuming execution of the guest virtual machine to write the data resumes the guest virtual machine at a point of execution other than the first point of execution at which execution of the guest virtual machine was initially intercepted.

2. The method of claim 1, wherein the initial interception of execution of the guest virtual machine at the first point of execution is a first interception and the interception of execution of the guest virtual machine at the second point of execution is a second interception, and wherein the deploying further comprises:

performing the redirecting execution of the thread to the function to open the handle to the file based on occurrence of the first interception of execution of the guest virtual machine, wherein the redirecting execution of the thread to the function to open the handle to the file comprises modifying, by the hypervisor, an instruction pointer value associated with the thread to an address of a system call for opening the handle to the file, wherein the resuming execution of the guest virtual machine to open the handle to the file resumes execution of the guest virtual machine to initiate the system call to open the handle to the file; and driving, by the hypervisor, the second interception of execution of the guest virtual machine, wherein the redirecting execution of the thread to the function to write the data is performed based on occurrence of the second interception of execution and comprises modifying, by the hypervisor, the instruction pointer value associated with the thread to an address of a system call for writing the data, wherein the resuming execution of the guest virtual machine to write the data resumes execution of the guest virtual machine to initiate the system call to write the data.

3. The method of claim 1, wherein the data comprises a first portion of the update, and wherein the deploying further comprises, for each additional portion of the update of one or more additional portions of the update, providing the additional portion of the update to the buffer component of the guest virtual machine, and redirecting execution of the thread to a function to write the additional data provided to the buffer component to the opened file.

4. The method of claim 1, wherein the deploying further comprises:

redirecting execution of the thread to a function to close the handle to the file;

and restoring an instruction pointer value associated with the thread to a saved instruction pointer value in order to restore execution of the thread to a point of execution of the thread prior to the deploying the update, the point of execution of the thread prior to the deploying the update corresponding to the first point of execution at which execution of the guest virtual machine was initially intercepted.

5. The method of claim 1, wherein the deploying further comprises:

determining a guest virtual machine current patch level based on a query by the hypervisor to the guest virtual machine for configuration information thereof, and determining that the update is to be deployed to the guest virtual machine, based on a comparison of the guest virtual machine current patch level to an indication of available updates for the guest virtual machine and based on a selection indicating that the update is to be applied to the guest virtual machine.

6. The method of claim 1, wherein the thread comprises a first thread of the guest virtual machine, and wherein the method further comprises:

initiating guest virtual machine installation of the deployed update, the initiating comprising:

redirecting execution of a second thread of the guest virtual machine to a function to invoke a new process on the guest virtual machine, the new process to execute a program of the guest virtual machine to handle the installation of the deployed update; and based on the redirecting the execution of the second thread to the function to invoke the new process, resuming execution of the guest virtual machine to invoke the new process.

7. The method of claim 1, wherein the deploying is performed while a virtual disk of the guest virtual machine is mounted by a guest operating system executing in the guest virtual machine.

8. The method of claim 1, wherein the deploying is performed absent introduction of external of code to the guest virtual machine for execution by the guest virtual machine to perform checking for the update, obtaining the update, or writing the update to the file.

9. A computer program product comprising:
a non-transitory computer-readable storage medium comprising program instructions for execution by a processor to perform a method comprising:
deploying an update to a guest virtual machine of a hypervisor during runtime of the guest virtual machine, the deploying comprising:
identifying an executing thread of the guest virtual machine, wherein the identifying comprises selecting the thread from a plurality of executing threads of the guest virtual machine, the selecting comprising identifying a respective security identifier of each thread of the plurality of executing threads of the guest virtual machine, and selecting the thread from the plurality of executing threads based on the security identifier of the thread indicating that the thread executes at a heightened privilege level;
initially intercepting execution of the guest virtual machine at a first point of execution;
redirecting execution of the thread to a first function to open a handle to a file, of the guest virtual machine, to which data of the update is to be written;
based on the redirecting the execution of the thread to the first function to open the handle to the file, resuming execution of the guest virtual machine to open the handle to the file, wherein based on the resuming execution of the guest virtual machine to open the handle to the file, the guest invokes execution of the first function to open the handle to the file;
providing, by a component executing outside of the guest virtual machine, the data to a buffer component of the guest virtual machine; and
intercepting execution of the guest virtual machine at a second point of execution;
redirecting, by the component executing outside of the guest virtual machine, execution of the thread to a second function to write the data, provided to the buffer component, from the buffer component to the file; and
based on the redirecting the execution of the thread to the second function to write the data from the buffer component to the file, resuming execution of the guest virtual machine to write the data, wherein based on resuming execution of the guest virtual machine to write the data, the guest invokes execution of the second function to write the data from the buffer component to the file, and wherein the resuming execution of the guest virtual machine to write the data resumes the guest virtual machine at a point of execution other than the first point of execution at which execution of the guest virtual machine was initially intercepted.

10. The computer program product of claim 9, wherein the initial interception of execution of the guest virtual machine at the first point of execution is a first interception and the interception of execution of the guest virtual machine at the second point of execution is a second interception, and wherein the deploying further comprises:

performing the redirecting execution of the thread to the function to open the handle to the file based on occurrence of a-the first interception of execution of the guest virtual machine, wherein the redirecting execution of the thread to the function to open the handle to the file comprises modifying, by the hypervisor, an instruction pointer value associated with the thread to an address of a system call for opening the handle to the file, wherein the resuming execution of the guest virtual machine to open the handle to the file resumes execution of the guest virtual machine to initiate the system call to open the handle to the file; and
driving, by the hypervisor, the second interception of execution of the guest virtual machine, wherein the redirecting execution of the thread to the function to write the data is performed based on occurrence of the second interception of execution and comprises modifying, by the hypervisor, the instruction pointer value associated with the thread to an address of a system call for writing the data, wherein the resuming execution of the guest virtual machine to write the data resumes execution of the guest virtual machine to initiate the system call to write the data.

11. The computer program product of claim 9, wherein the data comprises a first portion of the update, and wherein the deploying further comprises, for each additional portion of the update of one or more additional portions of the update, providing the additional portion of the update to the buffer component of the guest virtual machine, and redirecting execution of the thread to a function to write the additional data provided to the buffer component to the opened file.

12. The computer program product of claim 9, wherein the deploying further comprises: redirecting execution of the thread to a function to close the handle to the file; and restoring an instruction pointer value associated with the thread to a saved instruction pointer value in order to restore execution of the thread to a point of execution of the thread prior to the deploying the update, the point of execution of the thread prior to the deploying the update corresponding to the first point of execution at which execution of the guest virtual machine was initially intercepted.

13. The computer program product of claim 1, wherein the thread comprises a first thread of the guest virtual machine, and wherein the method further comprises:
initiating guest virtual machine installation of the deployed update, the initiating comprising:
redirecting execution of a second thread of the guest virtual machine to a function to invoke a new process on the guest virtual machine, the new process to execute a program of the guest virtual machine to handle the installation of the deployed update; and
based on the redirecting the execution of the second thread to the function to invoke the new process, resuming execution of the guest virtual machine to invoke the new process.

14. The computer program product of claim 9, wherein the deploying is performed while a virtual disk of the guest virtual machine is mounted by a guest operating system executing in the guest virtual machine.

15. The computer program product of claim 9, wherein the deploying is performed absent introduction of external of code to the guest virtual machine for execution by the guest virtual machine to perform checking for the update, obtaining the update, or writing the update to the file.

16. A computer system comprising:
a processor;
a memory storing program instructions, which, when executed by the processor, performs a method comprising:
deploying an update to a guest virtual machine of a hypervisor during runtime of the guest virtual machine, the deploying comprising:
identifying an executing thread of the guest virtual machine, wherein the identifying comprises selecting the thread from a plurality of executing threads of the guest virtual machine, the selecting comprising identifying a respective security identifier of each thread of the plurality of executing threads of the guest virtual machine, and selecting the thread from the plurality of executing threads based on the security identifier of the thread indicating that the thread executes at a heightened privilege level;
initially intercepting execution of the guest virtual machine at a first point of execution;
redirecting execution of the thread to a first function to open a handle to a file, of the guest virtual machine, to which data of the update is to be written;
based on the redirecting the execution of the thread to the first function to open the handle to the file, resuming execution of the guest virtual machine to open the handle to the file, wherein based on the resuming execution of the guest virtual machine to open the handle to the file, the guest invokes execution of the first function to open the handle to the file;
providing, by a component executing outside of the guest virtual machine, the data to a buffer component of the guest virtual machine;
intercepting execution of the guest virtual machine at a second point of execution;
redirecting execution of the thread to a second function to write the data, provided to the buffer component, from the buffer component to the file; and
based on the redirecting the execution of the thread to the second function to write the data from the buffer component to the file, resuming execution of the guest virtual machine to write the data, wherein based on resuming execution of the guest virtual machine to write the data, the guest invokes execution of the second function to write the data from the buffer component to the file, and wherein the resuming execution of the guest virtual machine to write the data resumes the guest virtual machine at a point of execution other than the first point of execution at which execution of the guest virtual machine was initially intercepted.

17. The computer system of claim 16, wherein the thread comprises a first thread of the guest virtual machine, and wherein the method further comprises:
initiating guest virtual machine installation of the deployed update, the initiating comprising: redirecting execution of a second thread of the guest virtual machine to a function to invoke a new process on the guest virtual machine, the new process to execute a program of the guest virtual machine to handle the installation of the deployed update; and
based on the redirecting the execution of the second thread to the function to invoke the new process, resuming execution of the guest virtual machine to invoke the new process.

18. The computer system of claim 16, wherein the deploying is performed absent introduction of external of code to the guest virtual machine for execution by the guest virtual machine to perform checking for the update, obtaining the update, or writing the update to the file.

* * * * *